(12) United States Patent
Kimura et al.

(10) Patent No.: US 9,769,753 B2
(45) Date of Patent: **\*Sep. 19, 2017**

(54) COMMUNICATION DEVICE AND COMMUNICATION METHOD AS WELL AS COMMUNICATION SYSTEM

(71) Applicant: SONY CORPORATION, Tokyo (JP)

(72) Inventors: Ryota Kimura, Tokyo (JP); Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 254 days.

This patent is subject to a terminal disclaimer.

(21) Appl. No.: 14/744,279

(22) Filed: Jun. 19, 2015

(65) Prior Publication Data

US 2015/0289206 A1    Oct. 8, 2015

Related U.S. Application Data

(63) Continuation of application No. 13/702,601, filed as application No. PCT/JP2011/061003 on May 12, 2011, now Pat. No. 9,100,912.

(30) Foreign Application Priority Data

Jun. 25, 2010    (JP) ................. 2010-145645

(51) Int. Cl.
*H04W 52/02* (2009.01)
*H04W 72/04* (2009.01)
(Continued)

(52) U.S. Cl.
CPC ....... *H04W 52/0216* (2013.01); *H04W 4/005* (2013.01); *H04W 52/0209* (2013.01);
(Continued)

(58) Field of Classification Search
CPC . H04W 52/0283; H04W 68/00; H04W 74/04; H04W 88/02; H04W 88/08;
(Continued)

(56) References Cited

U.S. PATENT DOCUMENTS

2007/0291728 A1\*  12/2007  Dalsgaard ............... H04L 12/12
                                                                            370/347
2009/0016252 A1\*  1/2009  Ho ..................... H04W 52/0283
                                                                            370/311
(Continued)

FOREIGN PATENT DOCUMENTS

CN          101039208 A      9/2007
WO      2007/148198 A     12/2007

OTHER PUBLICATIONS

European Extended Search Report received for European Patent Application No. 11797926.0, mailed on May 3, 2016, p. 10.

*Primary Examiner* — Nizar Sivji
(74) *Attorney, Agent, or Firm* — Chip Law Group

(57) ABSTRACT

A terminal intermittently operates while receiving paging information and other necessary information from a base station. In the terminal cycles of DRX with different lengths are combined in a hierarchy manner to determine an intermittent operation period. Upper DRX in the hierarchy has a longer cycle than lower DRX. A period using a cycle of the immediately lower DRX is determined based on information on the cycle of the upper DRX. An intermittent operation of a communication processing unit is controlled based on information on the cycle of DRX in a period using information on a cycle of the lowermost DRX.

16 Claims, 14 Drawing Sheets

(51) Int. Cl.
*H04W 4/00* (2009.01)
*H04W 76/04* (2009.01)
*H04W 68/00* (2009.01)

(52) U.S. Cl.
CPC ....... *H04W 72/042* (2013.01); *H04W 72/048* (2013.01); *H04W 72/0446* (2013.01); *H04W 76/048* (2013.01); *H04W 52/0229* (2013.01); *H04W 68/005* (2013.01); *Y02B 60/50* (2013.01)

(58) Field of Classification Search
CPC ......... H04W 52/0209; H04W 52/0216; H04W 88/06; H04B 1/40; H04B 1/707
See application file for complete search history.

(56) References Cited

U.S. PATENT DOCUMENTS

| | | | |
|---|---|---|---|
| 2010/0120378 A1* | 5/2010 | Harada | H04W 76/048 455/88 |
| 2010/0144358 A1 | 6/2010 | Iguchi et al. | |
| 2011/0032894 A1 | 2/2011 | Miki et al. | |
| 2011/0051645 A1 | 3/2011 | Hong et al. | |

* cited by examiner

COMMUNICATION DEVICE AND COMMUNICATION METHOD AS WELL AS COMMUNICATION SYSTEM

CROSS-REFERENCE TO RELATED APPLICATIONS

The present application is a continuation application of U.S. patent application Ser. No. 13/702,601, filed Dec. 7, 2012, which is a National Stage of PCT/JP11/61003, filed May 12, 2011, and claims the benefit of priority from prior Japanese Patent Application JP 2010-145645, filed Jun. 25, 2010, the entire content of which is hereby incorporated by reference.

TECHNICAL FIELD

The present invention relates to a communication device operating as a terminal in a communication system having a base station accommodating the terminal, and a communication method as well as a communication system, and particularly to a communication device for reducing consumed power due to intermittent reception while receiving paging information or other necessary information from a base station, and a communication method as well as a communication system.

BACKGROUND ART

A variety of communication services have been spread due to widely-used information processing and information communication techniques, and particularly communication systems including cell phones have been remarkably developed. At present, for 3GPP (Third Generation Partnership Project), the global standard of the third generation (3G) mobile communication system "IMT (International Mobile Telecommunications)-2000" defined by ITU (International Telecommunication Union) is being standardized. One data communication specification "LTE (Long Term Evolution)" defined by 3GPP is a long-term advanced system directed for the fourth generation (4G) IMT-Advanced, and is called "3.9G (super 3G)."

For example, a communication system having a base station accommodating a terminal has a problem of how to reduce consumed power of the terminal. In particular, it is important to reduce consumed power when the terminal is not making communication. Intermittent reception is widely known as one method for solving the problem. Intermittent reception is a communication control system for keeping a period for receiving a signal from a communication network at minimum while the terminal is not making communication, and for powering off a receiver during the remaining period thereby to reduce consumed power. For example, a cell phone powers on the receiver for receiving essential information such as paging information for a communication operation from a base station and powers off the receiver during other period. For the above 3GPP, an outline of the intermittent reception as DRX (discontinuous reception) is described (see Non-Patent Document 1, for example).

There are proposed a method for dividing terminals into a plurality of groups, shifting a cycle of DRX per group, and reducing a rate of the ON state in each cycle of DRX thereby reducing consumed power (see Patent Document 1, for example), and a method for using DRX with different cycles depending on a time (for example, daytime and nighttime), thereby further elongating the cycle of DRX (see Patent Document 2, for example).

A communication network is widely used in other than terminals directly used by persons for communication such as meters, automatic venders and electronic advertisements in addition to normal terminals directly used by persons such as conventional cell phones and PC (personal computer). In the following, the communication which is not directly used by persons is called MTC (Machine Type Communication), and a terminal which is not directly used by a person for communication is called a MTC terminal.

For MTC, a communication frequency necessary for the MTC terminal is relatively lower than the normal terminals (such as once a day, once a week or once a month), and the amount of data used for communication at a time is not large. On the other hand, it is expected that remarkably small consumed power is needed for the MTC terminal.

When the cycle of DRX is simply made longer for reducing consumed power, the terminal can fail to receive system information or paging information transmitted from the communication network. Thus, the terminal intermittently operates while securing a chance to accurately receive information from the communication network (the base station), thereby to further reduce consumed power of the terminal.

It is assumed that the communication of the MTC terminal is made according to a communication schedule desired by users inside the communication network or users outside the communication network. In this case, the communication network (the base station) needs to grasp the communication schedule and reflect it on the DRX setting in order to meet the conditions of the user-desired communication schedule.

CITATION LIST

Patent Documents

Patent Document 1: Japanese Patent No. 2669891
Patent Document 2: Japanese Patent No. 3270306

Non-Patent Document

Non-Patent Document 1: 3GPP TS36.321, "Evolved Universal Terrestrial Radio Access (E-UTRA) Medium Access Control (MAC) protocol specification (Release 9)"

i. SUMMARY OF THE INVENTION

Problems to be Solved by the Invention

It is an object of the present invention to provide a communication device excellent and capable of intermittently operating as a terminal suitably in a communication system having a base station accommodating the terminal, and a communication method as well as communication system.

It is another object of the present invention to provide a communication device excellent and capable of intermittently operating as a terminal suitably while receiving paging information or other necessary information from a base station, and a communication method as well as a communication system.

It is still another object of the present invention to provide a communication device excellent and capable of suitably making communication as a terminal while intermittently operating according to a communication schedule desired by users inside and outside a communication network, and a communication method as well as a communication system.

Solutions to Problems

The present application has been made in view of the above problems, and an invention according to claim 1 is a communication device including: a communication processing unit for performing digital processing and analog processing for transmitting and receiving data; and an intermittent operation control unit for determining whether to enter an intermittent operation period for intermittently operating the communication processing unit per second cycle by use of information on a first cycle longer than the second cycle, and for intermittently operating the communication processing unit.

With an invention according to claim 2 of the present application, the communication device according to claim 1 has a normal operation mode in which a communication operation is always performed in the communication processing unit and an intermittent operation mode in which a communication operation of the communication processing unit is intermittently performed. The intermittent operation control unit determines, based on the first cycle, whether to enter the intermittent operation period in the intermittent operation mode.

With an invention according to claim 3 of the present application, in the communication device according to claim 1 or 2, the intermittent operation control unit turns off at least part of circuits in the communication processing unit in a period other than the intermittent operation period.

With an invention according to claim 4 of the present application, the intermittent operation control unit of the communication device according to claim 1 generates a first timing signal which is switched on or off by the first cycle and a second timing signal which is switched on or off by the second cycle based on control information on the first and second cycles from a predetermined base station when being accommodated in a communication network of the base station, and determines the intermittent operation period based on the first timing signal and intermittently operates the communication processing unit based on the second timing signal in the intermittent operation period.

With an invention according to claim 5 of the present application, in the communication device according to claim 4, the ON period of the first timing signal is longer than the ON period of the second timing signal.

With an invention according to claim 6 of the present application, the intermittent operation control unit of the communication device according to claim 4 assumes the ON period of the first timing signal as the intermittent operation period, turns off at least part of the circuits in the communication processing unit in the OFF period of the first timing signal, turns on a communication operation of the communication processing unit in the ON period of the second timing signal in the intermittent operation period, and turns off the communication processing unit in the OFF period of the second timing signal.

With an invention according to claim 7 of the present application, the intermittent operation control unit of the communication device according to claim 4 starts the intermittent operation period when the first timing signal is turned on in other than the intermittent operation period, terminates the intermittent operation period when the first timing signal is turned on in the intermittent operation period, turns on a communication operation of the communication processing unit in the ON period of the second timing signal in the intermittent operation period, and turns off at least part of the circuits in the communication processing unit in the OFF period of the second timing signal.

With an invention according to claim 8 of the present application, the intermittent operation control unit of the communication device according to claim 4 assumes the ON period of the first timing signal as the intermittent operation period, turns off at least part of the circuits in the communication processing unit in the OFF period of the first timing signal, turns on a communication operation of the communication processing unit when the second timing signal is turned on in the OFF state of the communication processing unit in the intermittent operation period, and turns off the communication processing unit when the second timing signal is turned on in the ON state of the communication operation of the communication processing unit.

With an invention according to claim 9 of the present application, the intermittent operation control unit of the communication device according to claim 4 turns off at least part of the circuits in the communication processing unit when all necessary reception processing from the communication network ends even in a period which is determined to turn on the communication processing unit based on the second timing signal in the intermittent operation period.

With an invention according to claim 10 of the present application, predetermined correction processing is performed on a receiver in the communication processing unit when at least part of the circuits in the communication processing unit of the communication device according to claim 1 enters the intermittent operation period from the OFF state and receives radio frames again.

With an invention according to claim 11 of the present application, in the communication device according to claim 10, predetermined correction processing is performed on a receiver in the communication processing unit in the intermittent operation period and when the communication processing unit is in the OFF state.

With an invention according to claim 12 of the present application, the communication device according to claim 1 is configured such that the first intermittent operation mode has a first-2 cycle shorter than the first cycle, and when a predetermined even occurs, the intermittent operation mode switch unit replaces the first cycle with the first-2 cycle and determines a period of entering the second intermittent operation mode.

An invention according to claim 13 of the present application is a communication method including: a first step of determining whether to enter an intermittent operation period for intermittently operating a communication device based on information on a first cycle; and a second step of switching an ON state of a communication operation of the communication device and an OFF state of at least part of circuits per second cycle shorter than the first cycle in the intermittent operation period.

With an invention according to claim 14 of the present application, in the invention according to claim 13, the communication device has a normal operation mode of always performing a communication operation and an intermittent operation mode of intermittently performing a communication operation. The first step of the communication method according to claim 13 determines whether to enter the intermittent operation period in the intermittent operation mode based on the information on the first cycle, and further has a step of turning off the communication device in other than the intermittent operation period in the intermittent operation mode.

An invention according to claim 15 of the present application is a communication method including a first step of notifying parameters of the first intermittent operation mode for intermittent operation per first cycle and parameters of the second intermittent mode for intermittent operation per second cycle shorter than the first cycle, and a second step of notifying control information on the network to a communication device in the network in association with the first intermittent operation mode or the second intermittent operation mode.

An invention according to claim 16 of the present application is configured such that the second step in the communication method according to claim 15 is directed for notifying the control information on the network to the communication device in the network in association with a period in which the communication device in the network performs a communication operation in the first intermittent operation mode or in the second intermittent operation mode.

An invention according to claim 17 of the present application is a communication system including a base station for operating a communication network, and a terminal which includes a communication processing unit for performing digital processing and analog processing for transmitting and receiving data to and from the base station, sets a first cycle of a first intermittent operation mode and a second cycle of a second intermittent operation mode based on control information notified from the communication network, determines a period of entering the second intermittent operation mode based on the first cycle, turns off at least part of circuits in the communication processing unit in other than the period of entering the second intermittent operation mode in the first intermittent operation mode, and performs an intermittent operation on the communication processing unit per second cycle in the second intermittent operation mode.

The "system" described herein refers to a logical collection of devices (or function modules for realizing specific functions), and each device or function module may be or may not be in a single casing.

According to the present invention, there can be provided, in the communication system having a base station accommodating a terminal, a communication device excellent and capable of intermittently operating as a terminal suitably while receiving paging information or other necessary information from the base station, and a communication method as well as a communication system.

According to the present invention, there can be provided a communication device excellent and capable of suitably making communication as a terminal while intermittently operating according to a communication schedule desired by users inside and outside the communication network, and a communication method as well as a communication system.

With the invention according to claims 1 to 9 and 13 to 17 of the present application, the communication device uses the cycles of DRX with different lengths in a hierarchy manner thereby to acquire necessary information from the communication network in short cycle DRX while achieving a reduction in consumed power at the terminal in long cycle DRX (long sleep state).

With the invention according to claims 10 and 11 of the present application, since the correction processing such as synchronization or pull-in is performed on the communication processing unit when the communication processing unit transits to the ON state and receives radio frames again, the reception operation can be correctly performed even in the OFF (sleep) state for a long time.

With the invention according to claim 12 of the present application, two cycles with different lengths in the same DRX mode are defined and the long cycle is typically used, but when an event occurs, the cycle is switched to the short cycle, and thus the terminal can rapidly connect to the communication network when an event occurs. Thereby, the communication schedule of the terminal can be notified to the communication network via the server from the users inside and outside the communication network, and the schedule can be reflected on generation of the DRX cycle.

Other additional objects, characteristics and advantages of the present invention will be apparent with more detailed description based on the embodiment of the present invention and the accompanying drawings.

MODE FOR CARRYING OUT THE INVENTION

An embodiment according to the present invention will be described below in detail with reference to the drawings.

A structure of a network to which the present invention is applied will be described first. In the following description, MTC-related parts will be mainly described but terminals and servers other than MTC may be present in a communication network.

Figure 1:
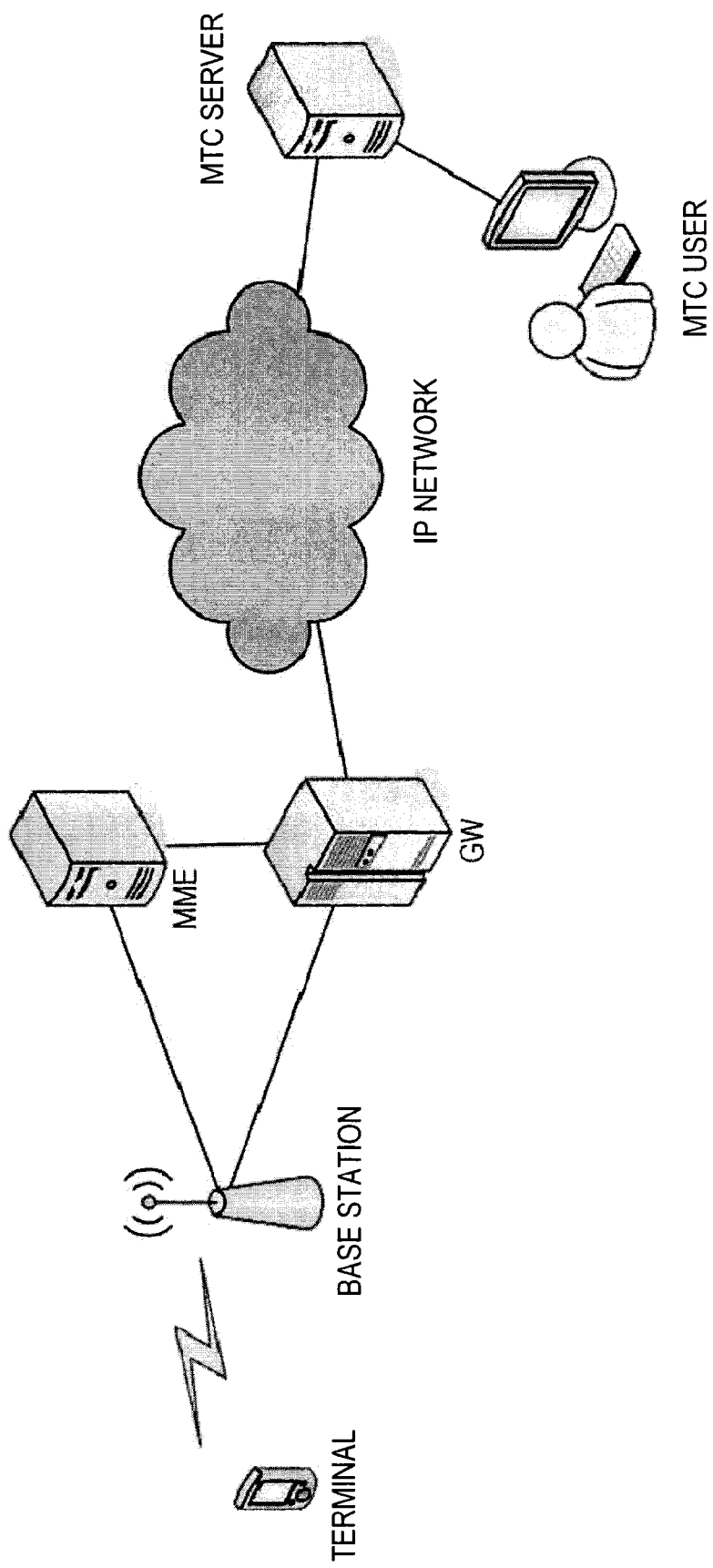
FIG. 1 is a diagram schematically illustrating a structure of a communication network to which the present invention is applied.

FIG. 1 schematically illustrates a structure of a communication network to which the present invention is applied. In the Figure, the communication network is a third generation mobile communication system whose specification is defined by 3GPP, for example. The communication network is configured of at least a base station, and may be arranged with a mobility management entity (MME) of a terminal and a gateway (GW) for an external network. The external network described herein is an IP (Internet Protocol) network, for example.

The terminals accommodated in the communication network include MTC terminals not directly used by persons for communication such as meters, automatic vendors and electronic advertisements. The MTC terminal is a terminal for making communication with a MTC user via a communication network, a MTC server or the like. The MTC user is a user utilizing MTC. For example, person-operating client machines or programs taking persons' works may be considered as part of the MTC users.

The MTC server is a server present between the MTC user and the MTC terminal, and is directed for converting an application level request from the MTC user into information for the MTC terminal or transmitting the information for the MTC terminal to the MTC terminal via the communication network. The server is not particularly limited in a physical meaning, and the functions of the MTC server can be provided in various forms.

In the exemplary structure of the communication network illustrated in FIG. 1, a terminal, a base station, a MME and a GW are arranged, respectively, but multiple ones may be arranged, respectively. In the Figure, the MTC server is present outside the GW or on an external network. When a MTC user is not an operator of the communication network, the illustrated structure may be assumed. The MTC user other than the operator of the communication network assumes an operator who collects information from the MTC terminal or distributes information to the MTC terminal, for example.

Figure 2:
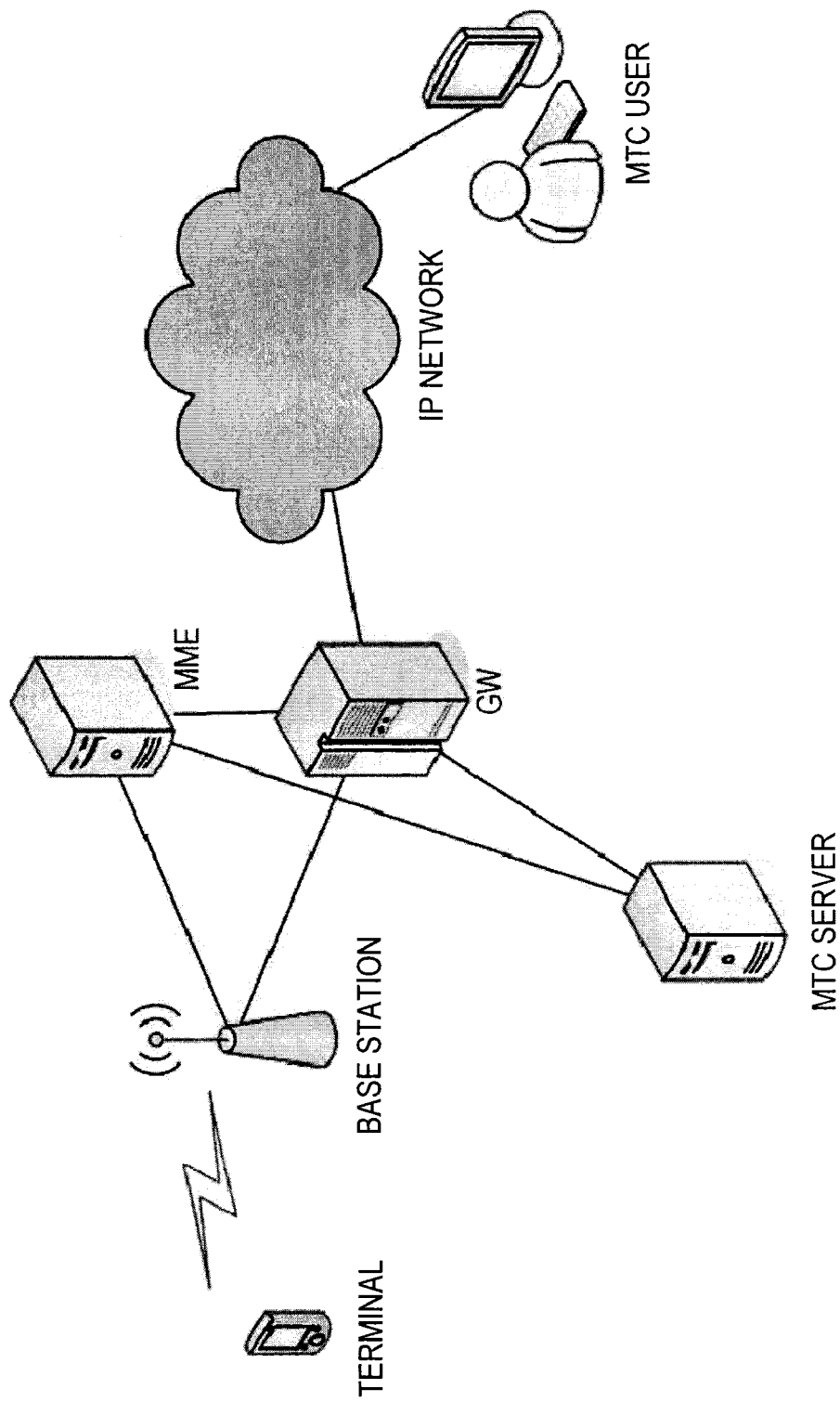
FIG. 2 is a diagram schematically illustrating other structure of the communication network to which the present invention is applied.

FIG. 2 schematically illustrates other structure of the communication network to which the present invention is applied. It is mainly different from the exemplary structure of the communication network illustrated in FIG. 1 in that the MTC server is arranged inside the communication network.

The MTC server is depicted as a physically-independent device in both the exemplary structures of the communication network illustrated in FIG. 1 and FIG. 2, but the present invention is not limited thereto, and the GW or other device may support the functions of the MTC server, for example.

DRX set in the communication network according to the embodiment of the present invention will be next described.

Figure 3:
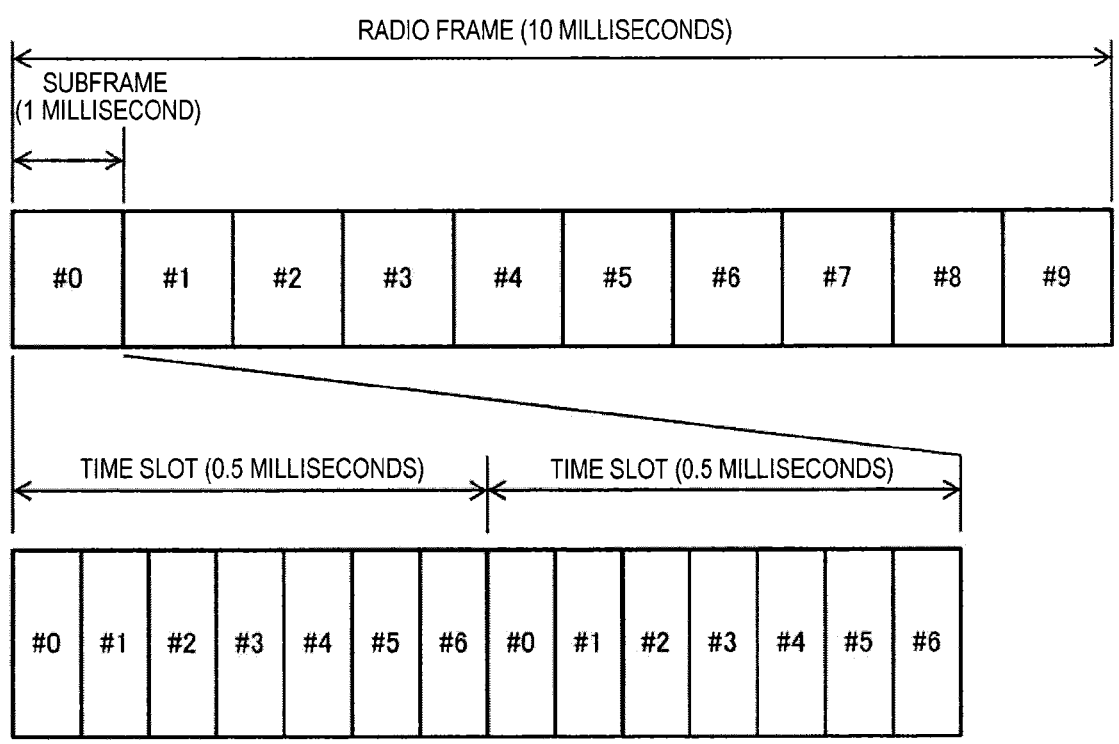
FIG. 3 is a diagram illustrating an exemplary structure of a radio frame transmitted from a base station to a terminal, which is defined by LTE of 3GPP.

For example, the MTC terminal is relatively lower in a necessary communication frequency than normal terminals, and needs to reduce consumed power of the terminal by DRX. For 3GPP, an outline of intermittent reception is described as DRX (described above). FIG. 3 illustrates an exemplary structure of a radio frame transmitted from the base station to the terminal, which is defined by LTE of 3GPP. The radio frame is formed in a three-layer hierarchy of time slot (Slot), subframe (Subframe) and radio frame (Radio Frame) in ascending order of time unit.

A time slot with 0.5 milliseconds is configured of seven OFDM symbols #0 to #6 (in the case of unicast transmission), and is a unit of a demodulation processing when being received on the user (mobile station) side. A subframe with one millisecond is configured of two successive time slots, and is a transmission time unit of a correction-encoded data packet. A radio frame with 10 milliseconds is configured of ten successive subframes #0 to #9 (that is, 20 time slots), and is a basic unit for multiplexing of all the physical channels.

With different subcarriers or different time slots, each terminal accommodated in the base station may make communication without mutual interference. A minimum unit of radio resource allocation, which is directed for blocking successive subcarriers and is called "resource block (RB)", is defined in LTE.

Figure 4:
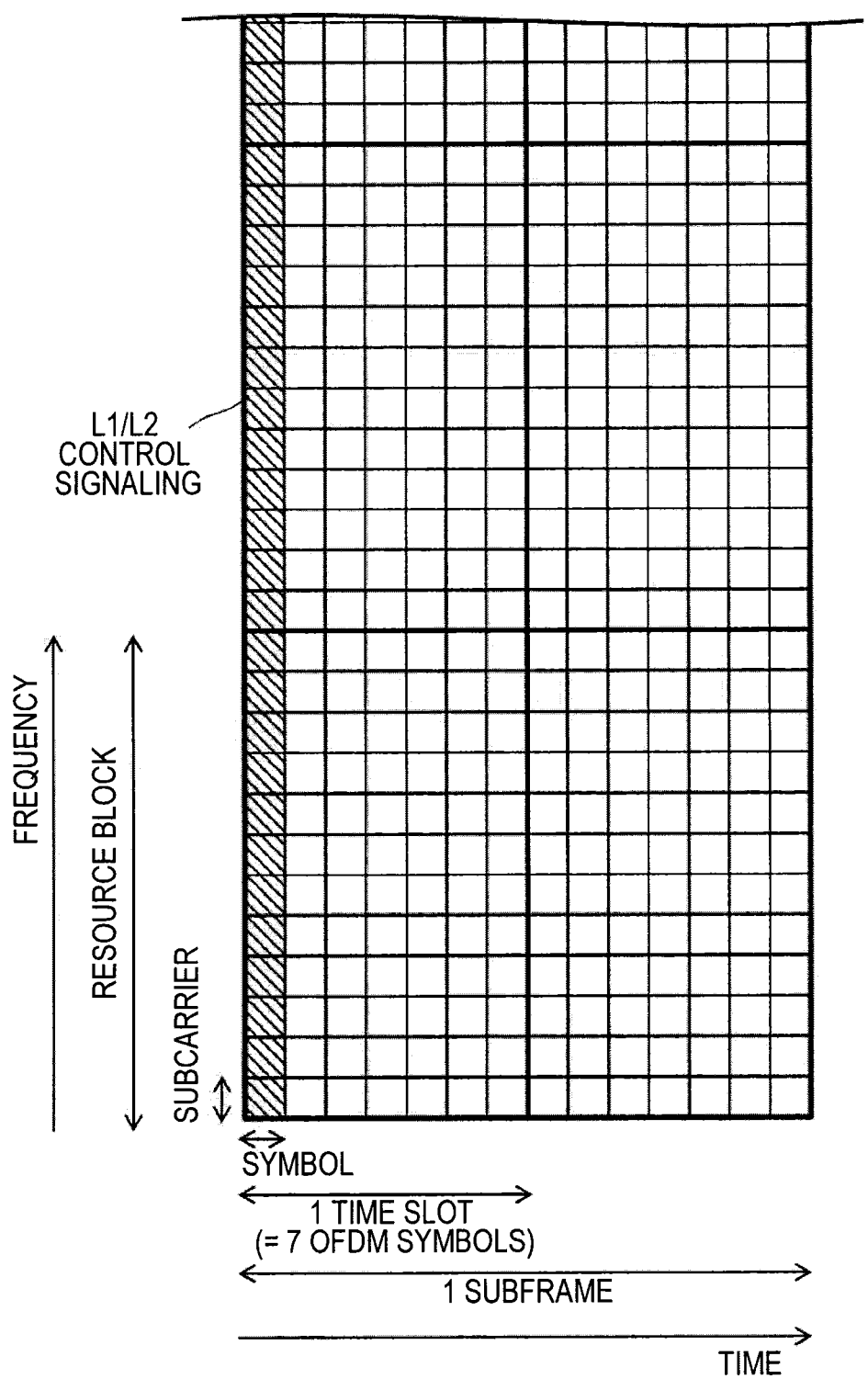
FIG. 4 is a diagram schematically illustrating how resource blocks are allocated.

A scheduler mounted on the base station allocates radio resources in units of resource block to each user. FIG. 4 schematically illustrates how the resource blocks are allocated. The resource block is configured of 12 subcarriers× one time slot (7 OFDM symbols=0.5 milliseconds), and in the Figure, the bold-line frame corresponds to one resource block. Up to three OFDM symbols from the head of the subframe are used for a control channel called "L1/L2 control signaling" (in the illustrated example, only one symbol from the head is used for the control channel). The scheduler of the base station can allocate the resource blocks per subframe or at intervals of 1 millisecond. Position information of the resource block is called scheduling. The scheduling information on uplink from the terminal to the base station and the scheduling information on downlink from the base station to the terminal are both described in the downlink control channel. Each user can recognize the resource blocks allocated to him/her through the control channel.

Though omitted in FIG. 3 and FIG. 4, it is noted that channels and signals are present.

In a radio frame, subframes, slots or symbols storing control information therein are transmitted from the base station at a predetermined time and frequency. The control information described herein is paging information describing call information or scheduling information describing channel allocation, for example. Each terminal accommodated in the base station receives and acquires the control information thereby to know network information of the network to which the terminal is connected, or resource allocation of subframes, slots and frequencies.

In DRX, the terminal enters the ON state in a predetermined cycle to receive predetermined subframes, slots or symbols of radio frames among the radio frames transmitted from the base station, and enters the OFF (sleep) state in other times. At least the receiver is stopped in the OFF state so that the terminal can achieve a reduction in consumed power.

Figure 5:
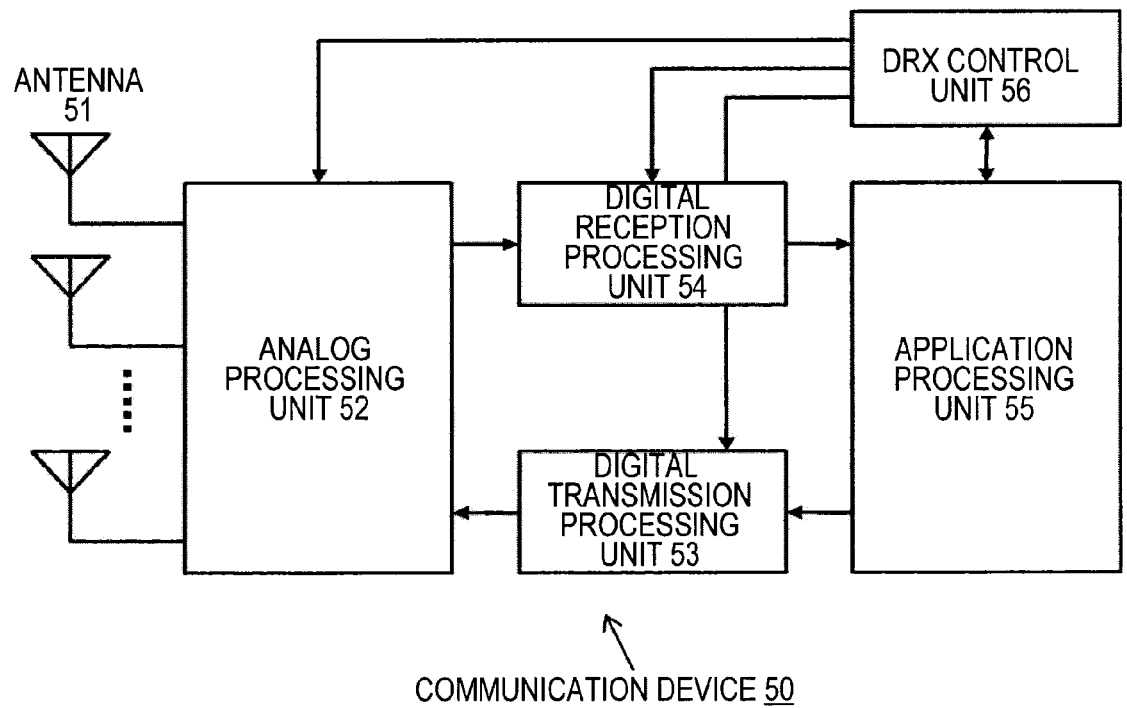
FIG. 5 is a diagram schematically illustrating an exemplary structure of a communication device operating as a terminal in a communication network of a base station.

FIG. 5 schematically illustrates an exemplary structure of the communication device operating as a terminal in the network of the base station.

The illustrated communication device 50 includes one or more antennas 51, an analog processing unit 52, a digital transmission processing unit 53, a digital reception processing unit 54, an application processing unit 55, and a DRX control unit 56.

The digital transmission processing unit 53 performs digital modulation such as OFDM on transmission data requested to transmit by the application processing unit 55. A transmission circuit in the analog processing unit 52 analog-converts a digital transmission signal, further up-converts it to a radio frequency band and amplifies its power to be delivered from the antenna 51.

A reception signal at the antenna 51 is amplified with low noise and down-converted in a reception circuit in the analog processing unit 52, and then digital-converted. The digital reception processing unit 54 performs digital demodulation such as OFDM on a digital reception signal, and recovers and passes reception data to the application processing unit 55. The digital reception processing unit 54 performs a synchronization (or pull-in) processing, frequency correction, channel estimation and the like.

The communication device 50 includes two or more antennas 51 thereby to make spatial multiplex communication. One or more antennas 51 may be employed and the present invention is not limited to a specific number of antennas.

The communication device 50 has a normal operation mode for always operating the communication processing units such as the analog processing unit 52, the digital transmission processing unit 53 and the digital reception processing unit 54, and a power-saving mode for turning off at least part of the circuits in the communication processing units thereby to reduce consumed power. An exemplary power-saving mode is an intermittent operation mode for intermittently performing DRX or a communication operation of the communication processing units, where at least part of the circuits in the communication processing units is turned off in a period in which the communication operation stops, thereby achieving low consumed power. The DRX control unit 56 controls for causing the communication processing units to perform the intermittent communication operation in the intermittent operation mode while the communication device 50 is acquiring necessary information from the communication network.

Generally, the intermittent operation repeatedly switches on and off the communication operation of the communication processing units with a cycle of DRX. When a rate of the period in which the communication operation is turned on in the cyclic period, that is, a duty ratio is low, low consumed power is more effective but a time in which information can be acquired from the communication network is shorter. The most basic intermittent operation employs only one DRX cycle, but to the contrary, the network according to the present embodiment is mainly characterized in that a period for the intermittent operation is determined in combination of the cycles of DRX with different lengths in a hierarchy manner. Upper DRX in the hierarchy has a longer cycle than lower DRX. A period using the cycle of the immediately lower DRX is determined based on the information on the cycle of the upper DRX.

In the period using the information on the cycle of the lowermost DRX, the intermittent operation of the communication processing units is controlled based on the information on the cycle of the DRX. In the present specification, a period using the information on the cycle of the lowermost DRX is called "intermittent operation period." The communication device 50 in the intermittent operation mode performs the intermittent operation on the communication processing units only in the intermittent operation period, and keeps at least part of the circuits in the communication processing units in the OFF state (the long sleep state) in the long period other than the intermittent operation period, thereby achieving low consumed power. The communication device 50 in the intermittent operation mode activates the communication operation of the communication processing units only in the intermittent operation period thereby to set the intermittent operation period for acquiring necessary information from the communication network.

The number of cycles or modes of DRX used in a hierarchy manner is not particularly limited. In the following, for simplified description, assuming that two cycles of DRX with different lengths of the first DRX "DRX1" with a long cycle T_DRX1 and the second DRX "DRX2" with a short cycle T_DRX2 (where, T_DRX1>T_DRX2) and immediately lower than the DRX1 are used in a hierarchy manner, the operations of the communication network will be considered.

The DRX control unit 56 in FIG. 5 uses the information on the cycle T_DRX1 of the upper DRX1 to determine a period using the information on the cycle T_DRX2 of the lower DRX2. Since the DRX2 is the lowermost DRX, the period using the information on the cycle T_DRX2 corresponds to the intermittent operation period, and in the period, the information on the cycle T_DRX2 is used to control the intermittent operation of the communication processing units. Since the communication operation stops in the long period other than the intermittent operation period in the intermittent operation mode, at least part of the circuits in the communication processing units is kept in the OFF state (in the long sleep state), thereby achieving low consumed power. The communication device 50 in the intermittent operation mode activates the communication operation of the communication processing units only in the intermittent operation period, and thus the cycle T_DRX1 of the DRX1 and the cycle T_DRX2 of the DRX2 are set in the communication network for the proper intermittent operation period in which necessary information can be acquired from the communication network. In the present specification, information on DRX in the communication network including the information on the cycle T_DRX1 of the DRX1 and the information on the cycle T_DRX2 of the DRX2 will be called "DRX control information."

Figure 6:
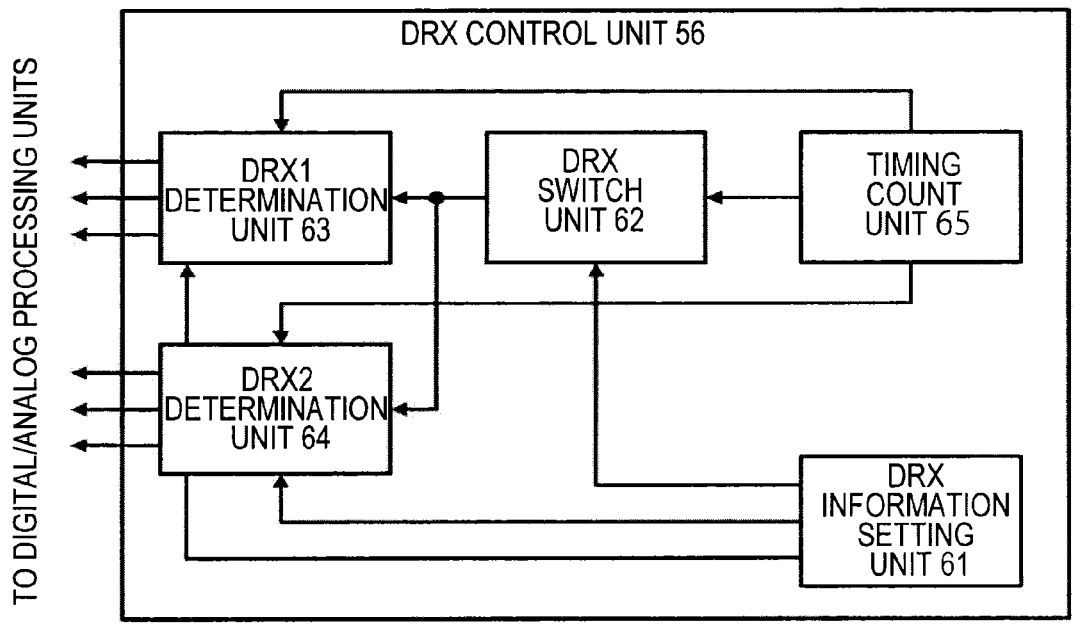
FIG. 6 is a diagram illustrating an exemplary internal structure of a DRX control unit 56.

FIG. 6 illustrates an exemplary internal structure of the DRX control unit 56. The DRX control unit 56 includes a DRX information setting unit 61, a DRX switch unit 62, a DRX1 determination unit 63, a DRX2 determination unit 64, and a timing count unit 65.

The DRX information setting unit 61 sets the DRX switch unit 62, the DRX1 determination unit 63 and the DRX2 determination unit 64 according to the DRX control information received from the application processing unit 55. The DRX information setting unit 61 uses a timing count signal from the timing count unit 65 to generate a DRX1 timing signal with the cycle T_DRX1 of the DRX1 and a DRX2 timing signal with the cycle T_DRX2 of the DRX2 and to supply them to the DRX switch unit 62, the DRX1 determination unit 63 and the DRX2 determination unit 64. The DRX control information includes information on a duty ratio between the cycle T_DRX1 of the DRX1 and the DRX1 timing signal and a duty ratio between the cycle T_DRX2 of the DRX2 and the DRX2 timing signal. The information on the duty ratios described herein may be the values of the duty ratios, or the values directly indicating the length of the ON period and the length of the OFF period of the DRX1 timing signal and the DRX2 timing signal.

The DRX switch unit 62 switches to the period using the DRX2 timing signal or the intermittent operation period based on the ON/OFF switch timing of the DRX1 timing signal input from the DRX information setting unit 61, and inputs an instruction into the DRX1 determination unit 63 and the DRX2 determination unit 64.

The DRX1 determination unit 63 compares the DRX1 timing signal input from the DRX information setting unit 61 with the timing count signal input from the timing count unit 65, and controls the intermittent operation of the digital reception processing unit 54 and the analog processing unit 52 in the period other than the intermittent operation period in the intermittent operation mode.

The DRX2 determination unit 64 compares the DRX2 timing signal input from the DRX information setting unit 61 with the timing count signal input from the timing count unit 65, and controls the intermittent operation of the digital transmission processing unit 53, the digital reception processing unit 54 and the analog processing unit 52 in the intermittent operation period.

Figure 7:
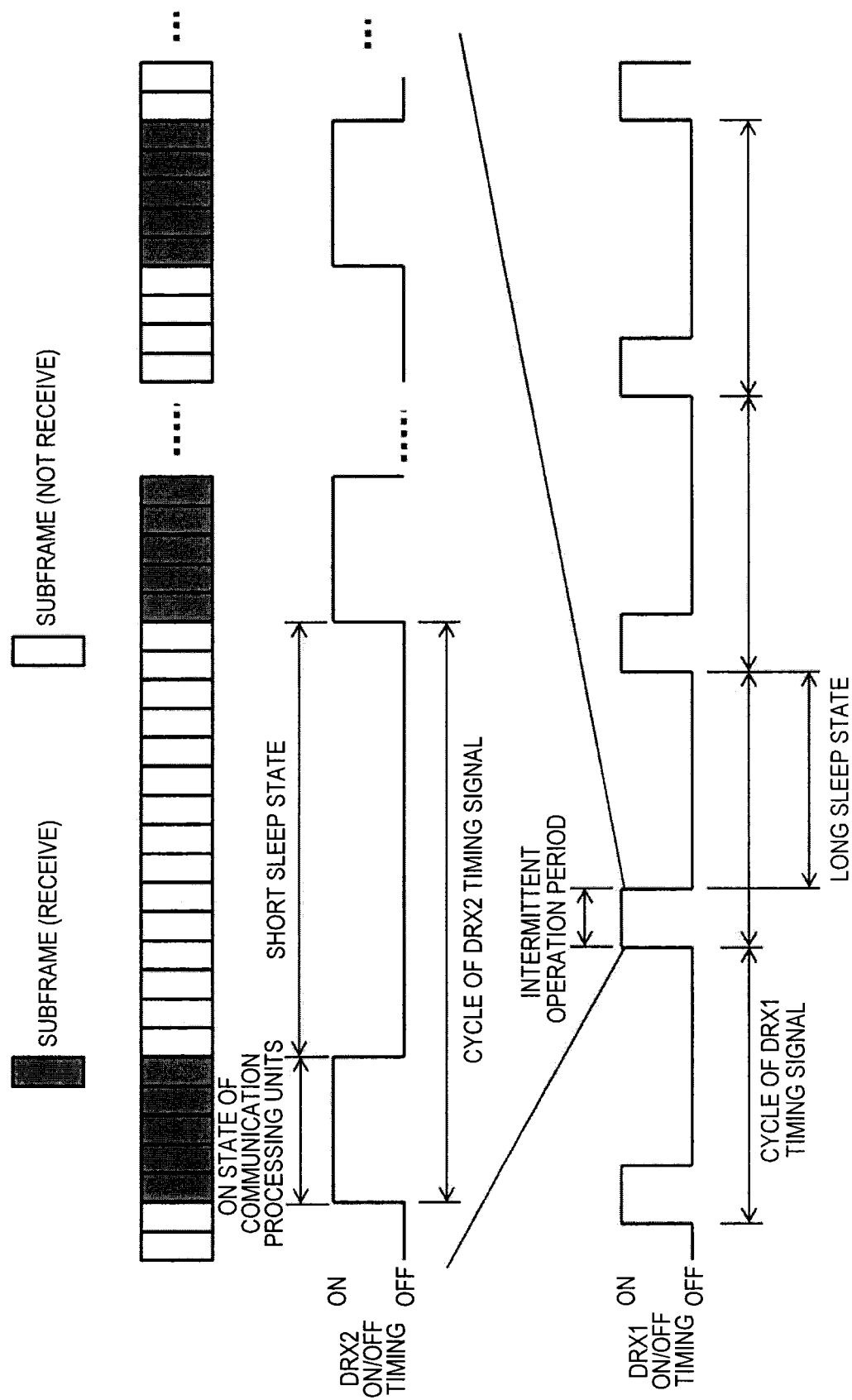
FIG. 7 is a diagram illustrating exemplary DRX in which DRX1 having a long cycle T_DRX1 and DRX2 having a short cycle T_DRX2 are used in a hierarchy manner.

FIG. 7 illustrates exemplary DRX using DRX1 with a long cycle T_DRX1 and DRX2 with a short cycle T_DRX2 in a hierarchy manner (T_DRX1≤T_DRX2). In the illustrated example, the intermittent operation period is as long as the ON period of the upper DRX1 timing signal and the communication operation is performed only in the ON period of the lower DRX2 timing signal in the intermittent operation period. Thus, the ON period of the upper DRX1 timing signal is inevitably longer than the ON period of the lower DRX2 timing signal.

The intermittent operation period in which the communication processing units are intermittently operated based on the immediately lower DRX2 timing signal is set based on the upper DRX1 timing signal in the hierarchy DRX.

In the example illustrated in FIG. 7, when entering the ON period of the DRX1 timing signal, the DRX switch unit 62 determines to start the intermittent operation period, and entering the OFF period of the DRX1 timing signal, determines to terminate the intermittent operation period. The DRX1 determination unit 63 keeps at least part of the circuits in the digital transmission processing unit 53, the digital reception processing unit 54 and the analog processing unit 52 in the OFF state in other than the intermittent operation period (that is, puts the terminal in the long sleep state).

When entering the intermittent operation period, the DRX2 determination unit 64 determines ON/OFF of the DRX2 timing signal, and turns on the digital transmission processing unit 53, the digital reception processing unit 54 and the analog processing unit 52 in the ON period of the DRX2 timing signal, and waits for the control information to be received from the radio frames or the communication network (the base station). The DRX2 determination unit 64 turns off the digital transmission processing unit 53, the digital reception processing unit 54 and the analog processing unit 52 in the OFF period of the DRX2 timing signal (that is, puts the terminal in the short sleep state).

The cycles of DRX with different lengths are used in a hierarchy manner as illustrated in FIG. 7 so that the terminal can acquire necessary information from the communication network in the short DRX cycle while achieving a reduction in consumed power of the terminal in the long DRX cycle. The number of cycles of the hierarchy DRX is not limited to two. The DRX unit is a subframe, but reception is possible in other unit.

Figure 8:
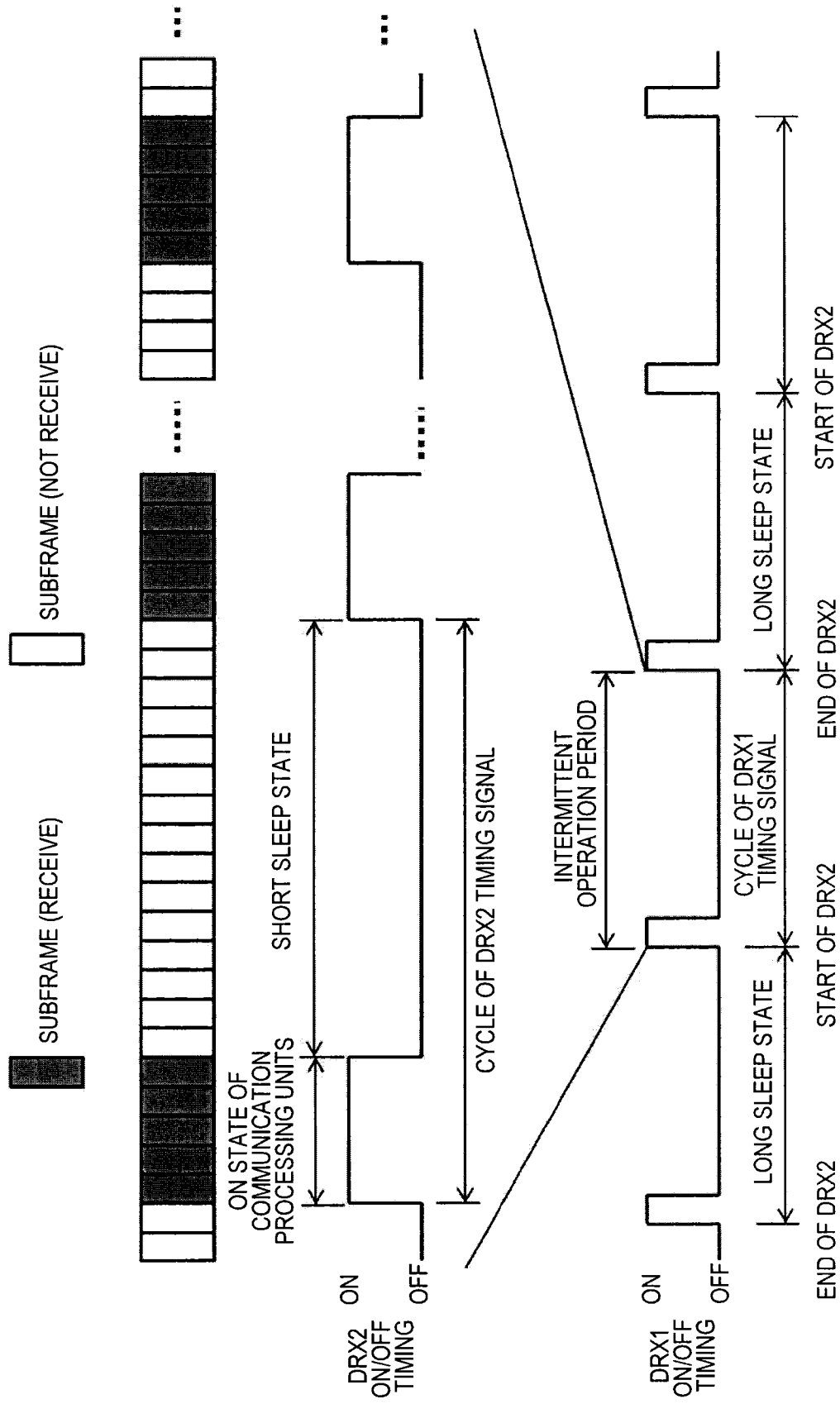
FIG. 8 is a diagram illustrating another exemplary DRX in which DRX1 having a long cycle T_DRX1 and DRX2 having a short cycle T_DRX2 are used in a hierarchy manner.

FIG. 8 illustrates other exemplary DRX using DRX1 with a long cycle T_DRX1 and DRX2 with a short cycle T_DRX2 in a hierarchy manner. T_DRX1>T_DRX2 is assumed. In the illustrated example, a rise of the upper DRX1 timing signal is used to determine the start point and the end point of the intermittent operation period, and thus the length of the ON period is meaningless. Since the communication operation is performed only in the ON period of the lower DRX2 timing signal in the intermittent operation period, when a duty ratio is made higher, the reception chances increase but lower consumed power is less effective.

The intermittent operation period for intermittently operating the communication processing units based on the immediately lower DRX2 timing signal is set based on the upper DRX1 timing signal in the hierarchy DRX. While the intermittent operation period is in the ON period of the DRX1 timing signal in the example illustrated in FIG. 7, the intermittent operation period starts when the DRX1 timing signal is turned on outside the intermittent operation period and the intermittent operation period ends when the DRX1 timing signal is turned on in the intermittent operation period in the example illustrated in FIG. 8 (that is, whenever the DRX1 timing signal is turned on, the intermittent operation period alternately starts and ends in a repeated manner).

In the example illustrated in FIG. 8, the DRX switch unit 62 determines to start the intermittent operation period when the DRX1 timing signal is turned on not in the DRX2 mode. The DRX switch unit 62 determines to terminate the intermittent operation period when the DRX1 timing signal is turned on in the intermittent operation period.

The DRX2 determination unit 64 determines ON/OFF of the DRX2 timing signal in the intermittent operation period, and turns on the digital transmission processing unit 53, the digital reception processing unit 54 and the analog processing unit 52 and waits for the control information to be received from the communication network (the base station) in the ON period of the DRX2 timing signal. The DRX2 determination unit 64 turns off the digital transmission processing unit 53, the digital reception processing unit 54 and the analog processing unit 52 in the OFF period of the DRX2 timing signal (that is, puts the terminal in the short sleep state). The DRX1 determination unit 63 turns off the digital transmission processing unit 53, the digital reception processing unit 54 and the analog processing unit 52 in the period other than the intermittent operation period (that is, puts the terminal in the long sleep state).

The cycles of DRX with different lengths are used in a hierarchy manner as illustrated in FIG. 8 so that the terminal can acquire necessary information from the communication network in the short DRX cycle while achieving a reduction in consumed power of the terminal in the long DRX cycle. The number of cycles of the hierarchy DRX is not limited to two. The DRX unit is a subframe, but reception is possible in other unit.

Figure 9:
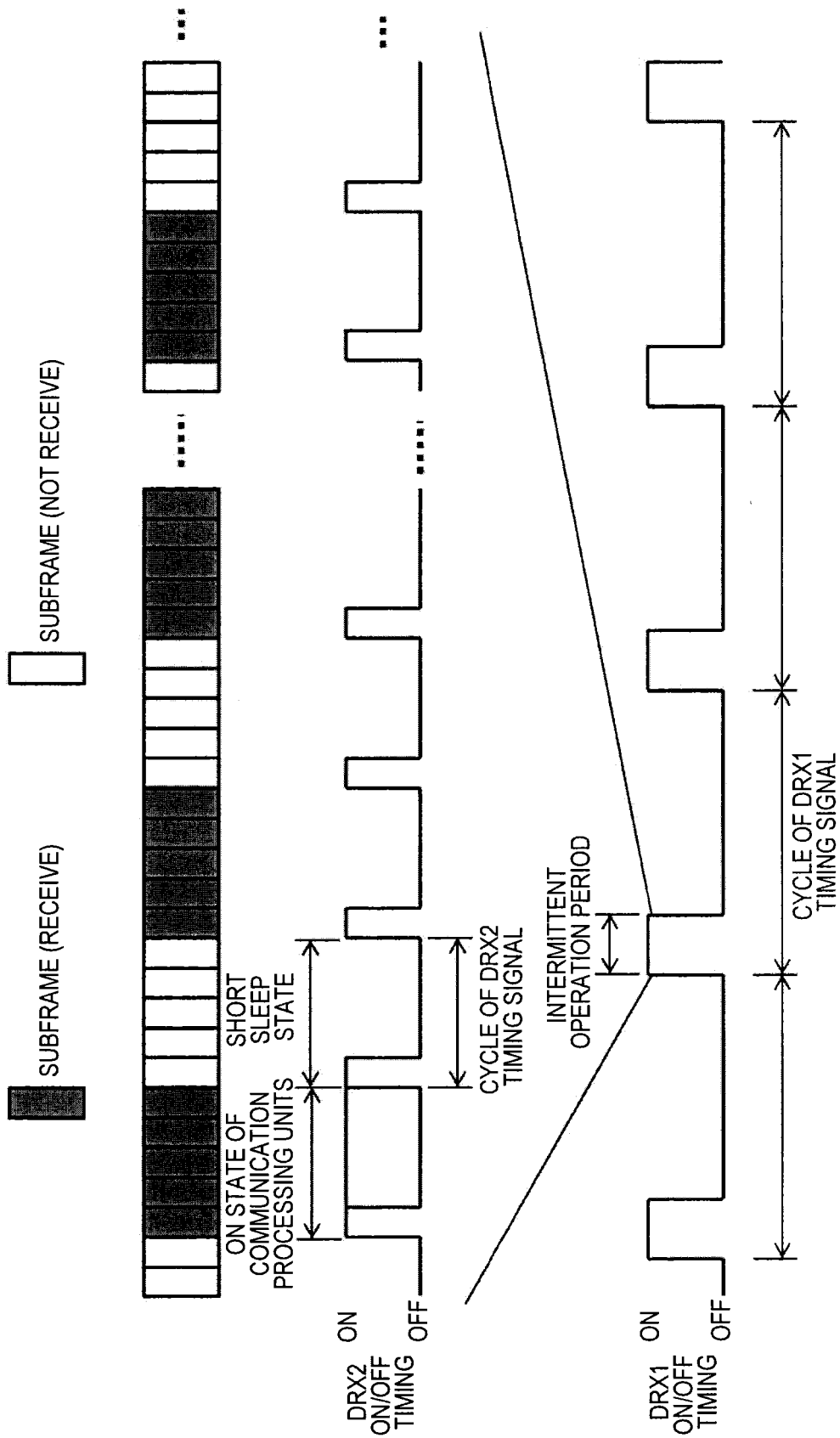
FIG. 9 is a diagram illustrating still another exemplary DRX in which DRX1 having a long cycle T_DRX1 and DRX2 having a short cycle T_DRX2 are used in a hierarchy manner.

FIG. 9 illustrates still another exemplary DRX using the DRX1 mode with a long cycle T_DRX1 and the DRX2 mode with a short cycle T_DRX2 in a hierarchy manner. T_DRX1>T_DRX2 is assumed. In the illustrated example, it may be desirable that the ON period of the upper DRX1 timing signal is longer than the ON period of the lower DRX2 timing signal (ditto). Since the intermittent operation period is as long as the ON period of the upper DRX1 timing signal, when the duty ratio is made higher, the reception chances increase. Since a rise of the lower DRX2 timing signal is used to determine the start point and the end point of the communication operation in the intermittent operation period, the length of the ON period is meaningless.

The intermittent operation period for intermittently operating the communication processing units based on the immediately lower DRX2 timing signal is set based on the upper DRX1 timing in the hierarchy DRX. In the example illustrated in FIG. 9, the intermittent operation period is in the ON period of the DRX1 timing signal similarly as in the example illustrated in FIG. 7. While the communication operation is performed in the ON period of the DRX2 timing signal in the intermittent operation period in the example illustrated in FIG. 7, the communication operation starts when the DRX2 timing signal is turned on while the communication operation is stopping in the intermittent operation period, and the communication operation stops when the DRX2 timing signal is turned on during the communication operation (that is, whenever the DRX2 timing signal is turned on, the communication operation alternately starts and stops in a repeated manner) in the example illustrated in FIG. 9.

In the example illustrated in FIG. 9, the DRX switch unit 62 determines to start the intermittent operation period when entering the ON period of the DRX1 timing signal, and determines to terminate the intermittent operation period when entering the OFF period of the DRX1 timing signal. The DRX1 determination unit 63 keeps at least part of the circuits in the digital transmission processing unit 53, the digital reception processing unit 54 and the analog processing unit 52 in the OFF state in other than the intermittent operation period (that is, puts the terminal in the long sleep state).

In the intermittent operation period, the DRX2 determination unit 64 starts the communication operation when the DRX2 timing signal is turned on while the communication processing units such as the digital transmission processing unit 53, the digital reception processing unit 54 and the analog processing unit 52 stop the communication operation, and waits for the control information to be received from the radio frames or the communication network (the base station). When the DRX2 timing signal is turned on during the communication operation of the communication processing units, the communication operation of the communication processing units stops (that is, the terminal is put in the sleep state). Thereafter, whenever the DRX2 timing signal is turned on, the reception waiting state and the (short) sleep state are alternately switched.

The cycles of DRX with different lengths are used in a hierarchy manner as illustrated in FIG. 9, the terminal can acquire necessary information from the communication network in the short DRX cycle while achieving a reduction in consumed power of the terminal in the long DRX cycle. The number of cycles of the hierarchy DRX is not limited to two. The DRX unit is a subframe, but reception is possible in other unit.

In the examples illustrated in FIG. 7 to FIG. 9, the radio frame are continuously received only in the intermittent operation period in the intermittent operation mode. However, when the terminal can finish all the required reception processing in the intermittent operation period, the communication processing units may exit the intermittent operation period and may be turned off without waiting for the intermittent operation period determined based on the DRX1 timing signal to end. Thereby, the terminal can further achieve a reduction in consumed power.

When the cycles of DRX with different lengths are used in a hierarchy manner as described above, it is assumed that the MTC terminal in the intermittent operation mode is in the OFF (sleep) state for a long time other than the intermittent operation period. Thus, when the MTC terminal transits to the ON state and receives the radio frames again, correction (synchronization or pull-in) of the receiver may be required. A method using a known part of a signal transmitted from the base station, or the like is specifically assumed in order to correct the receiver, but the present invention is not limited to a specific correction method.

For a timing when the MTC terminal corrects the receiver, it is assumed that pull-in or synchronization is performed when the receiver is not in ON after the intermittent operation period starts. Thereby, it is possible to correct the receiver in order to keep the reception quality while achieving a reduction in consumed power when the communication processing units are in the OFF (sleep) state in the period other than the intermittent operation period determined by the DRX1 timing signal. The receiver may be corrected in other timing. For example, also in the OFF state other than the intermittent operation period, the terminal may voluntarily make a correction. In this case, the terminal temporarily enters the ON state.

Figure 10:
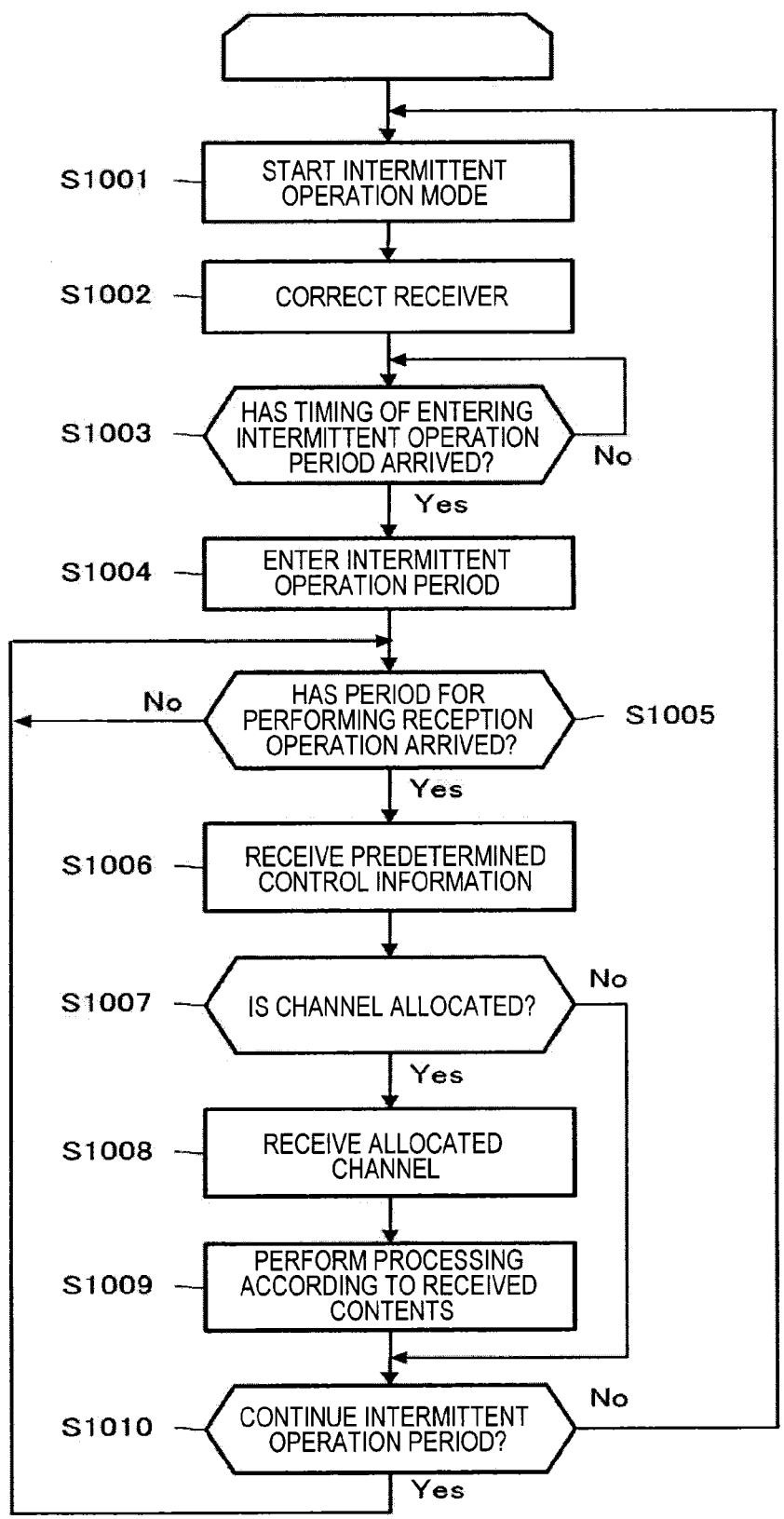
FIG. 10 is a flowchart illustrating a processing procedure performed by a communication device 50 operating as a terminal in a communication network in an intermittent operation (DRX) mode.

FIG. 10 illustrates the processing procedure performed by the communication device 50 operating as a terminal in the communication network in the intermittent operation (DRX) mode in a form of flowchart. Herein, when entering the intermittent operation mode, the terminal uses the long cycle T_DRX1 and the short cycle T_DRX2 in a hierarchy manner.

When the intermittent operation mode starts according to the determination by the DRX switch unit 62 (step S1001), the digital reception processing unit 54 performs a correction processing such as synchronization or pull-in before the communication processing units are turned on (step S1002).

Thereafter, the DRX switch unit 62 monitors the DRX1 timing signal and waits for a timing of entering the intermittent operation period to arrive (No in step S1003). Then, when the timing of entering the intermittent operation period arrives (Yes in step S1003), the terminal enters the intermittent operation period (step S1004).

In the intermittent operation period, the DRX2 determination unit 64 compares the DRX2 timing signal input from the DRX information setting unit 61 with the timing count signal input from the timing count unit 65, and waits for a period for performing the reception operation to arrive (No in step S1005).

Then, when the period for performing the reception operation arrives (Yes in step S1005), the DRX2 determination unit 64 turns on the receiver, that is, the digital reception processing unit 54 and the analog processing unit 52, and receives predetermined control information from the communication network (step S1006).

The control information described herein is paging information describing call information or scheduling information describing channel allocation, for example. The control information received from the communication network is analyzed to check whether a channel is allocated to the terminal (step S1007). When a channel is allocated (Yes in step S1007), the digital reception processing unit 54 and the analog processing unit 52 receive the allocated channel (step S1008), and performs processing according to the contents received in the application processing unit 55 (step S1009).

Thereafter, the DRX switch unit 62 checks whether to continue the intermittent operation period based on the DRX1 timing signal (step S1010). When the DRX2 mode is to be continued (Yes in step S1010), the processing returns to step S1005 to wait for the period for performing the reception operation to arrive. When the intermittent operation period is not to be continued (No in step S1010), the processing returns to step S1001.

Figure 11:
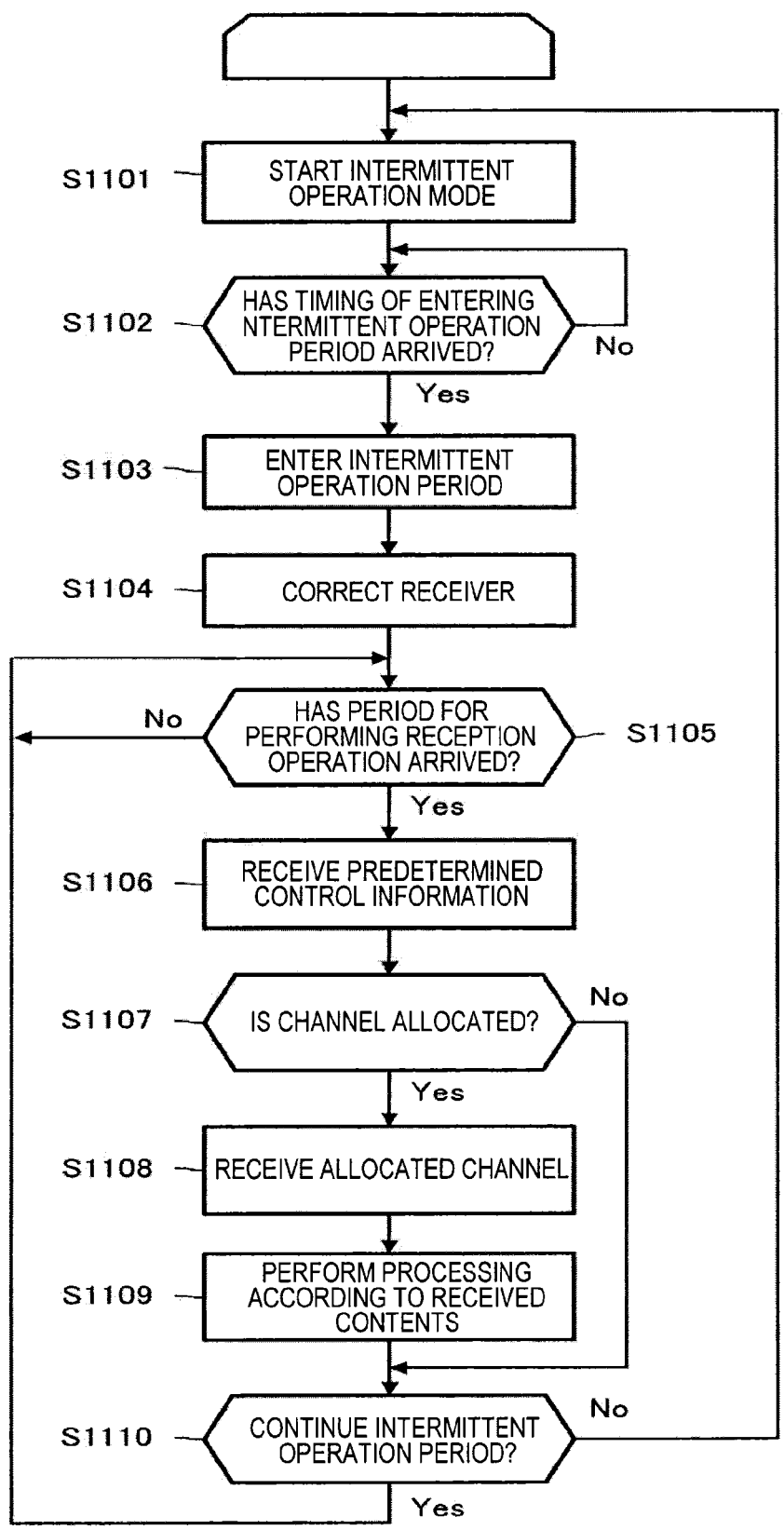
FIG. 11 is a flowchart illustrating another exemplary processing procedure performed by the communication device 50 operating as a terminal in a communication network in the intermittent operation (DRX) mode.

FIG. 11 illustrates another exemplary processing procedure performed by the communication device 50 operating as a terminal in the communication network in the intermittent operation (DRX) mode in a form of flowchart. Herein, when entering the intermittent operation mode, the terminal uses the long cycle T_DRX1 and the short cycle T_DRX2 in a hierarchy manner (ditto).

When the intermittent operation mode starts according to the determination by the DRX switch unit 62 (step S1101), the DRX switch unit 62 monitors the DRX1 timing signal, and waits for a timing of entering the intermittent operation period to arrive (No in step S1102). Then, when the timing of entering the intermittent operation period arrives (Yes in step S1102), the terminal enters the intermittent operation period (step S1103).

When entering the intermittent operation period, the receiver or the digital reception processing unit 54 performs the correction processing such as synchronization or pull-in before the receiver is turned on (step S1104).

In the intermittent operation period, the DRX2 determination unit 64 compares the DRX2 timing signal input from the DRX information setting unit 61 with the timing count signal input from the timing count unit 65, and waits for a period for performing the reception operation to arrive (No in step S1105).

When the period for performing the reception operation arrives (Yes in step S1105), the DRX2 determination unit 64 turns on the receiver, that is, the digital reception processing unit 54 and the analog processing unit 52, and receives predetermined control information from the communication network (step S1106).

Then, the control information received from the communication network is analyzed and a check is made as to whether a channel is allocated to the terminal (step S1107). Then, when a channel is allocated (Yes in step S1107), the digital reception processing unit 54 and the analog processing unit 52 receive the allocated channel (step S1108), and perform processing according to the contents received in the application processing unit 55 (step S1109).

Thereafter, the DRX switch unit 62 checks whether to continue the intermittent operation period based on the DRX1 timing signal (step S1110). When the intermittent operation period is to be continued (Yes in step S1110), the processing returns to step S1105 to wait for the period for performing the reception operation to arrive. When the intermittent operation period is not to be continued (No in step S1110), the processing returns to step S1001.

Figure 12:
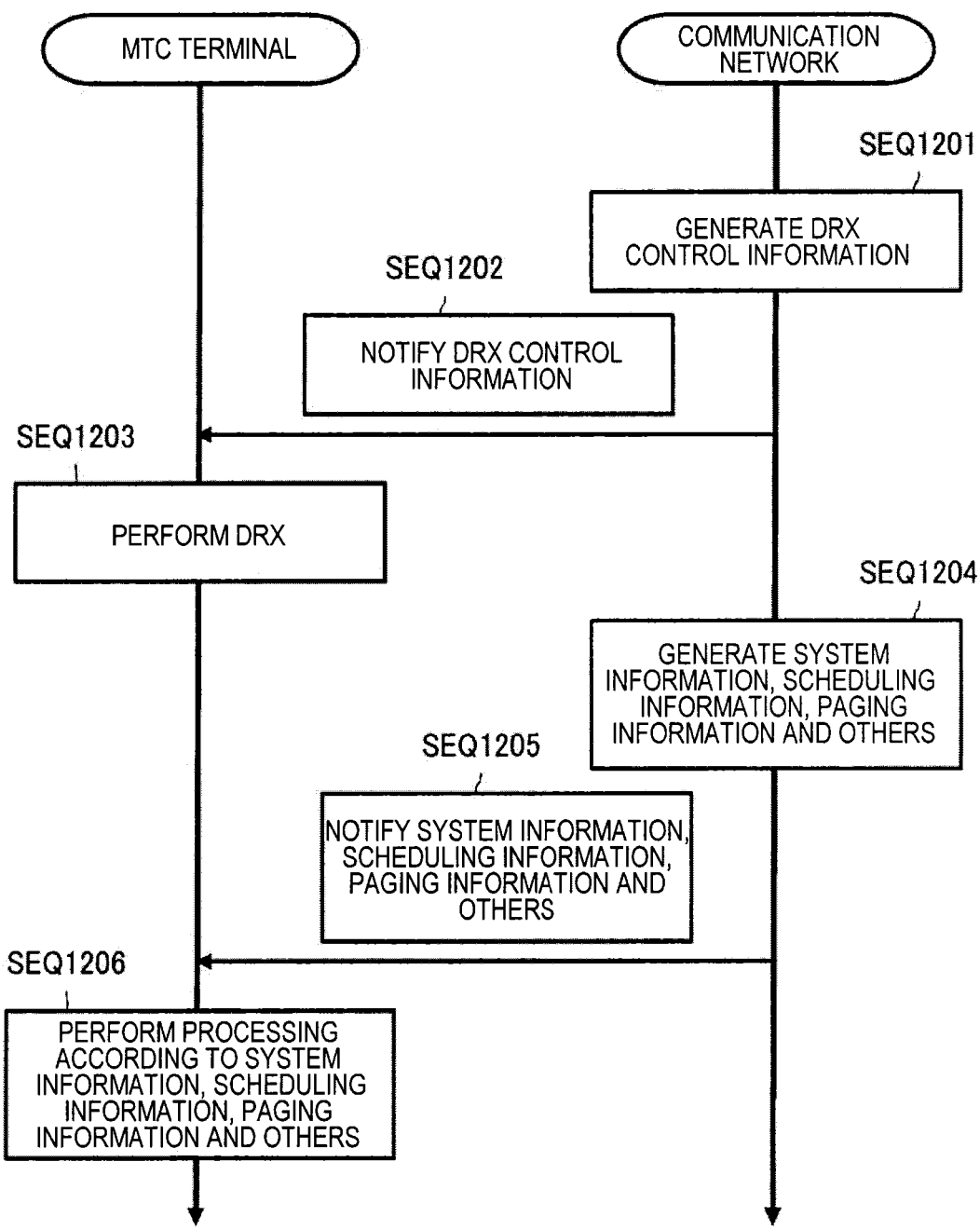
FIG. 12 is a diagram illustrating an exemplary communication sequence performed between a communication network and a terminal.

FIG. 12 illustrates an exemplary communication sequence performed between the communication network and the MTC terminal.

In the communication network, for example, the base station generates DRX control information necessary for performing DRX at the terminal (SEQ1201). Herein, the DRX control information is generated for using a plurality of DRX modes with different cycles in a hierarchy manner. The DRX control information includes the information on the cycle T_DRX1 of the DRX1 and the information on the cycle T_DRX2 of the DRX2. Then, the generated DRX control information is notified to the MTC terminal from the communication network (SEQ1202).

Then, the MTC terminal sets the cycles and the duty ratios of the DRX1 timing signal and the DRX2 timing signal based on the received DRX control information, and performs DRX according to any operation procedure illustrated in FIG. 7 to FIG. 9, for example (SEQ1203).

The communication network generates system information, paging information, scheduling information and the like (SEQ1204). Then, after the cycles and the duty ratios of the DRX1 timing signal and the DRX2 timing signal are set for the MTC terminal as described above, the system information, the paging information, the scheduling information and the like are transmitted to the MTC terminal so as to conform to the cycles (or the subframes in which the MTC terminal performs the reception operation) (SEQ1205).

When receiving the system information, the paging information, the scheduling information and the like, the MTC terminal performs processing according to the information (SEQ1206). Thereby, the MTC terminal can both reduce consumed power with the long cycle T_DRX1 (the long sleep state) and acquire necessary information from the communication network.

In the exemplary communication sequence illustrated in FIG. 12, it is assumed that DRX in the MTC terminal is basically set from the communication network side. Typically, DRX is set from the communication network side according to a communication frequency of the network information.

However, it is assumed that the MTC terminal is in the sleep state for a long time, but communication may be needed due to an occurrence of an event at a timing other than the initial schedule. The event described herein may include an emergency situation or failure occurring in the MTC terminal. In consideration of convenience of the MTC, even when such an event occurs, the communication network and the MTC terminal need to properly operate. In the following, the DRX control system depending on an occurred event will be considered.

There has been employed, as an example in which the cycles of DRX with different lengths are used in a hierarchy manner, the case in which two DRX modes of the first DRX "DRX1" with a long cycle T_DRX1 and the second DRX "DRX2" with a short cycle T_DRX2 (where T_DRX1>T_DRX2) and immediately lower than the DRX1 are used in a hierarchy manner. To the contrary, two cycles with different lengths of T_DRX1$a$ and T_DRX1$b$ are defined as the cycles corresponding to the DRX1 (where T_DRX1$a$>T_DRX1$b$) in case the communication is needed due to an occurred event. The DRX1 timing signal driven at the cycle T_DRX1$a$ is typically used to determine the intermittent operation period, but when an event occurs, the cycle is switched to the DRX1 timing signal driven at T_DRX1$b$ to determine the intermittent operation period. Specifically, the DRX information setting unit 61 may change the DRX1 cycle from T_DRX1$a$ to T_DRX1$b$ to change the DRX1 timing signal, and the DRX switch unit 62 may determine the intermittent operation period by use of the changed DRX1 timing signal. With the cycle switching, the terminal can rapidly make connection to the communication network when an event occurs.

Figure 13:
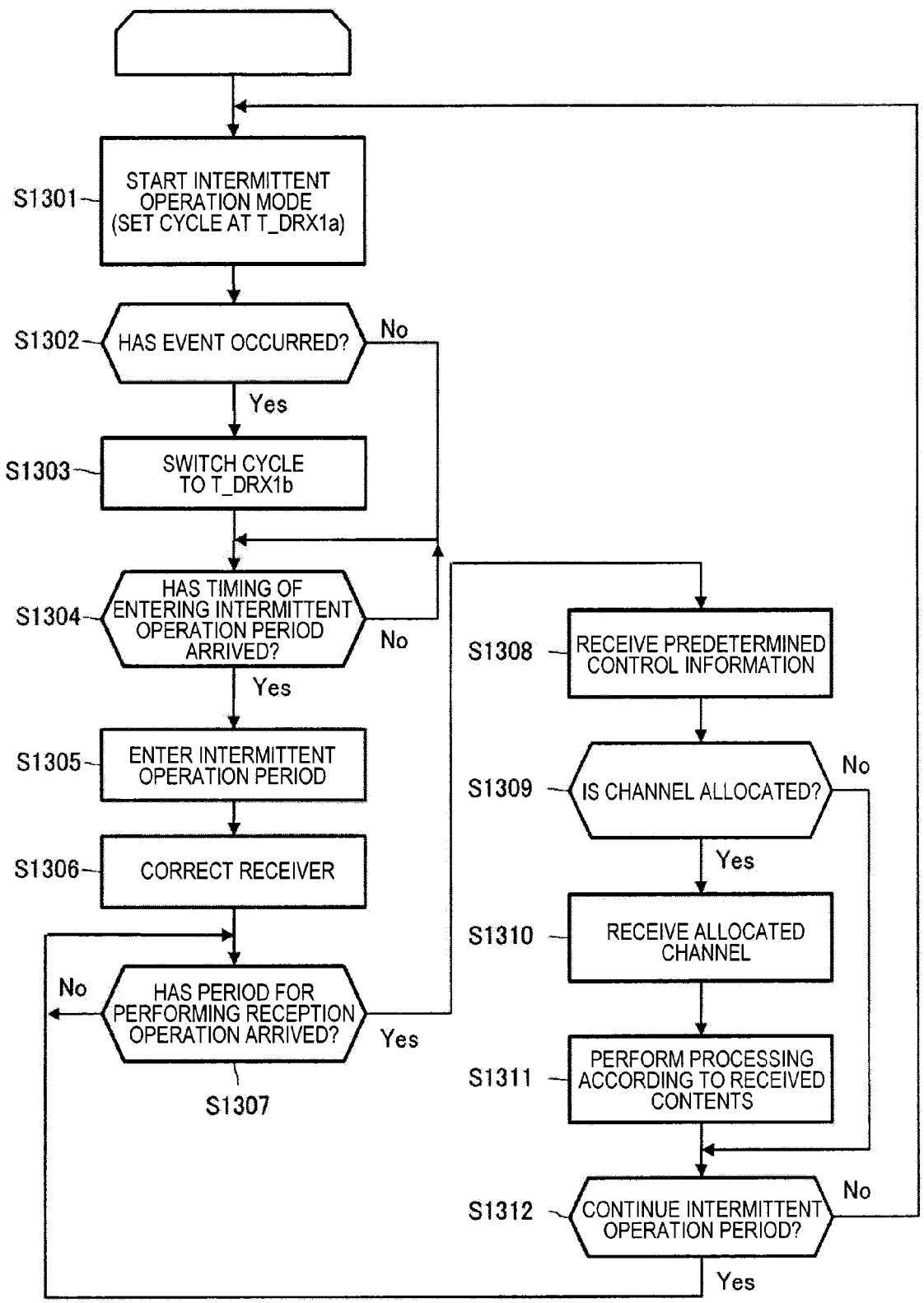
FIG. 13 is a flowchart illustrating a processing procedure performed by the communication device 50 operating as a terminal corresponding to an occurred event in a communication network in the intermittent operation (DRX) mode.

FIG. 13 illustrates a processing procedure performed by the communication device 50 operating as a terminal corresponding to an occurred event in the communication network in the intermittent operation (DRX) mode in a form of flowchart.

When the intermittent operation mode starts according to the determination by the DRX switch unit 62 (step S1301), the DRX information setting unit 61 first sets the cycle of the DRX1 at T_DRX1$a$ and then generates the DRX1 timing signal.

Then, a check is made as to whether a predetermined event has occurred in the intermittent operation mode (in the period not in the intermittent operation period) (step S1302).

For an event, an occurrence of an even at the application layer level in the MTC terminal or sensor detection is assumed. The present invention is not limited to a specific event detection method.

When a predetermined event has occurred (Yes in step S1302), the DRX information setting unit 61 switches the cycle of the DRX1 from T_DRX1a to T_DRX1b thereby to change the DRX1 timing signal (step S1303). Consequently, the DRX switch unit uses the changed DRX1 timing signal to determine the intermittent operation period.

On the other hand, when a predetermined event has not occurred (No in step S1302), the DRX information setting unit 61 generates the DRX1 timing signal with the cycle of the DRX1 kept at T_DRX1a, and the DRX switch unit 62 uses the DRX1 timing signal to determine the intermittent operation period.

The DRX switch unit 62 monitors the DRX1 timing signal and waits for a timing of entering the intermittent operation period to arrive (No in step S1304). Then, when the timing of entering the intermittent operation period arrives (Yes in step S1304), the terminal enters the intermittent operation period (step S1305).

When entering the intermittent operation period, the receiver or the digital reception processing unit 54 performs the correction processing such as synchronization or pull-in prior to activating the reception operation (step S1306).

In the intermittent operation period, the DRX2 determination unit 64 compares the DRX2 timing signal input from the DRX information setting unit 61 with the timing count signal input from the timing count unit 65, and waits for a period for performing the reception operation to arrive (No in step S1307).

Then, when the period for performing the reception operation arrives (Yes in step S1307), the DRX2 determination unit 64 turns on the receiver, that is, the digital reception processing unit 54 and the analog processing unit 52, and receives predetermined control information from the communication network (step S1308).

Then, the control information received from the communication network is analyzed and a check is made as to whether a channel is allocated to the terminal (step S1309). Then, when a channel is allocated (Yes in step S1309), the digital reception processing unit 54 and the analog processing unit 52 receive the allocated channel (step S1310), and performs processing according to the contents received in the application processing unit 55 (step S1311).

Thereafter, the DRX switch unit 62 checks whether to continue the intermittent operation period based on the DRX1 timing signal (step S1312). When the intermittent operation period is to be continued (Yes in step S1312), the processing returns to step S1307 to wait for a period for performing the reception operation to arrive. When the intermittent operation is not to be continued (No in step S1312), the processing returns to step S1301.

Figure 14:
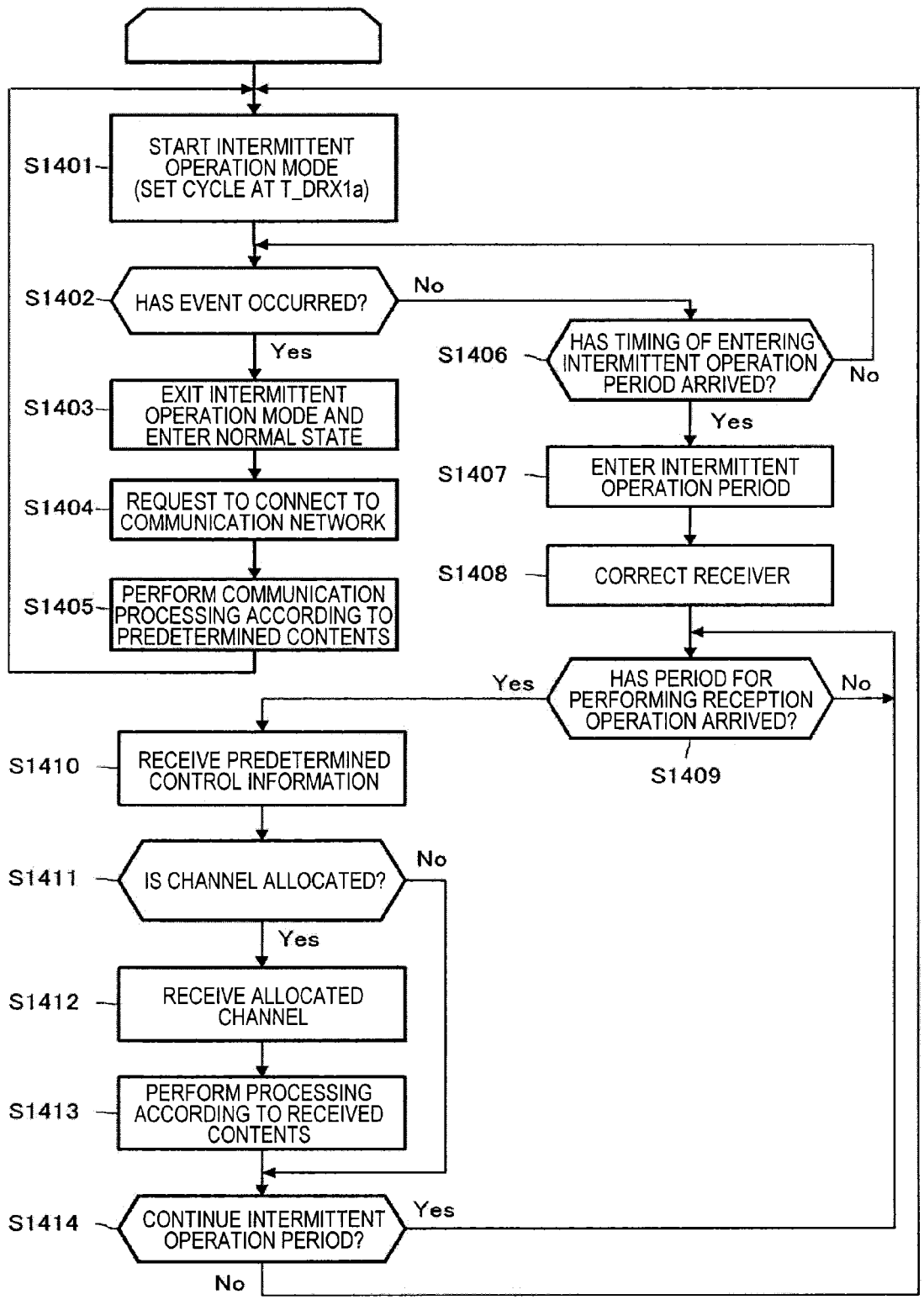
FIG. 14 is a flowchart illustrating another exemplary processing procedure performed by the communication device 50 operating as a terminal corresponding to an occurred event in a communication network in the intermittent operation (DRX) mode.

FIG. 14 illustrates another exemplary processing procedure performed by the communication device 50 operating as a terminal corresponding to an occurred event in the communication network in the intermittent operation (DRX) mode in a form of flowchart.

When the intermittent operation mode starts according to the determination by the DRX switch unit 62 (step S1401), the DRX information setting unit 61 sets the cycle of the DRX1 at T_DRX1a and generates the DRX1 timing signal.

Then, a check is made as to whether a predetermined event has occurred in the intermittent operation mode (in the period not in the intermittent operation period) (step S1402).

Herein, when a predetermined event has occurred (Yes in step S1402), the terminal exits the intermittent operation mode and enters the normal communication state to always perform the reception operation (step S1403). Then, the terminal issues a request of connecting to the communication network (the base station) (step S1404), and when connection is established, performs the communication processing according to the predetermined contents (step S1405). Thereafter, the terminal returns to step S1401.

On the other hand, when a predetermined event has not occurred (No in step S1402), the DRX switch unit 62 monitors the DRX1 timing signal and waits for a timing of entering the intermittent operation period to arrive (No in step S1406). Then, when the timing of entering the intermittent operation period arrives (Yes in step S1406), the terminal enters the intermittent operation period (step S1407).

When entering the intermittent operation period, the receiver or the digital reception processing unit 54 performs the correction processing such as synchronization or pull-in before the receiver is turned on (step S1408).

In the intermittent operation period, the DRX2 determination unit 64 compares the DRX2 timing signal input from the DRX information setting unit 61 with the timing count signal input from the timing count unit 65, and waits for a period for performing the reception operation to arrive (No in step S1409).

When the period for performing the reception operation arrives (Yes in step S1409), the DRX2 determination unit 64 turns on the receiver, that is, the digital reception processing unit 54 and the analog processing unit 52, and receives predetermined control information from the communication network (step S1410).

Then, the control information received from the communication network is analyzed, and a check is made as to whether a channel is allocated to the terminal (step S1411). Then, when a channel is allocated (Yes in step S1411), the digital reception processing unit 54 and the analog processing unit 52 receive the allocated channel (step S1412) and perform processing according to the contents received in the application processing unit 55 (step S1413).

Thereafter, the DRX switch unit 62 checks whether to continue the intermittent operation period based on the DRX1 timing signal (step S1414). When the intermittent operation period is to be continued (Yes in step S1414), the processing returns to step S1409 to wait for a period for performing the reception operation to arrive. When the intermittent operation period is not to be continued (No in step S1414), the processing returns to step S1401.

MTC applications may include meters, automatic vendors, electronic advertisements and the like. Thus, an intention of the MTC user is desirably reflected on the communication contents and the communication schedule of the MTC terminal. Particularly, the communication schedule largely has a relationship with DRX. In consideration of the MTC applications, it is naturally expected that the communication schedule is longer, such as daily, weekly and monthly, unlike the typical communication.

The communication schedule desired by the MTC user needs to be put under the DRX control on the communication network side in order to efficiently apply the DRX control to the system. Therefore, it is desirable that a function of notifying the communication schedule desired by the MTC user to the communication network is inside the communication network or outside the communication network. A MTC server is assumed for realizing the function.

Figure 15:
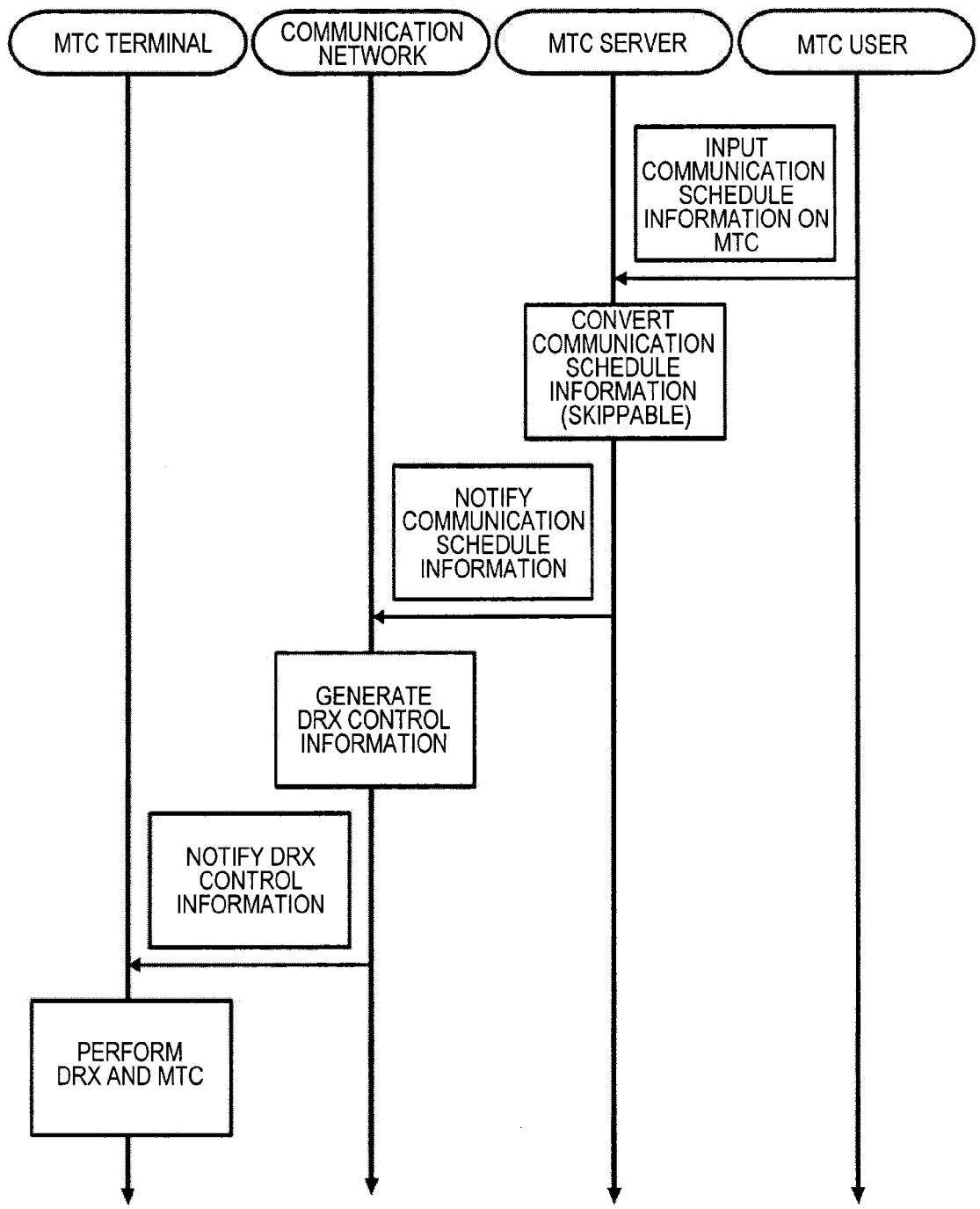
FIG. 15 is a diagram illustrating an exemplary communication control procedure between a MTC user, a MTC server, a communication network and a MTC terminal.

FIG. 15 illustrates an exemplary communication control procedure between the MTC user, the MTC server, the communication network and the MTC terminal. In the Figure, the MTC user, the MTC server, the communication network and the MTC terminal are classified not physically but logically. For example, the MTC server can also have the functions of the MTC user or the GW in the communication network can also have the functions of the MTC server. In FIG. 15, only exchange of information at the logic level and in the application layer is noted, and ACK/NACK or retransmission when a communication error occurs in the lower layer is omitted. Any protocol is applicable to the protocol in the lower layer.

The functions of the MTC server for controlling DRX with respect to the communication network may have the following.

(1) A function of receiving information on the contents of the MTC or the schedule from the MTC user.

(2) A function of notifying the communication interval and the cycle of the target MTC terminal to the communication network based on the schedule.

For the function (1), the information input from the MTC user may be manually input by the MTC user or may be automatically generated by the MTC user (the client machine). The input method is not limited.

For the function (2), the MTC server may simply notify the schedule information as time information to the communication network or may convert and notify it into a unit (radio frame, subframe, slot or the like) according to the frame structure of the communication network to the communication network.

When receiving the schedule information from the MTC server, the communication network generates control information on the actual DRX from the schedule, and controls DRX of the target MTC terminal. The DRX control information is notified to the MTC terminal via the base station. The schedule information received from the MTC server can be longer (time, day, week, month or the like) as time information handled by the communication network. Thus, it is desirable to consider a hierarchy of DRX at the communication network level such that the MTC terminal can both reduce consumed power and acquire the network information. The longest DRX cycle needs to be shorter than the schedule cycle set by the MTC user in the DRX setting at the communication network level.

INDUSTRIAL APPLICABILITY

The present invention has been described above in detail with reference to the specific embodiment. However, it is apparent that those skilled in the art can modify or replace the embodiment without departing from the spirit of the present invention.

The embodiment in which the present invention is applied to the communication network based on the data communication specification defined by LTE of 3GPP has been mainly described in the present specification, but the present invention is not limited thereto. The present invention is applicable to various types of communication networks configured of the base stations accommodating terminals.

The embodiment in which the present invention is applied to the MTC terminal not directly used by persons for communication has been mainly described in the present specification, but the present invention is not limited thereto. The present invention is applicable to various types of terminals directly used by persons for communication other than MTC, or various types of communication systems other than illustrated ones in FIG. 1 and FIG. 2.

That is, the present invention is disclosed by way of example, and the described contents in the present specification should not be definitely interpreted. The range of claims should be considered for determining the spirit of the present invention.

REFERENCE SIGNS LIST

50 Communication device
51 Antenna
52 Analog processing unit
53 Digital transmission processing unit
54 Digital reception processing unit
55 Application processing unit
56 DRX control unit
61 DRX information setting unit
62 DRX switch unit
63 DRX1 determination unit
64 DRX2 determination unit
65 Timing count unit

The invention claimed is:

1. A communication device, comprising:
communication processing circuitry configured to receive data; and
at least one processor configured to:
determine whether to enter an intermittent operation period for an intermittent operation of the communication processing circuitry per second cycle based on information on a first cycle longer than the second cycle, and intermittently operate the communication processing circuitry;
generate a first time which is switched on or off by the first cycle and a second time which is switched on or off by the second cycle based on control information on the first cycle and the second cycle from a base station; and
determine the intermittent operation period based on the first time, wherein the communication processing circuitry is intermittently operated based on the second time in the intermittent operation period.

2. The communication device according to claim 1, wherein
the communication device is configured to operate in a normal operation mode, in which the communication processing circuitry is further configured to execute a communication operation, and an intermittent operation mode in which the communication processing circuitry is further configured to intermittently execute the communication operation, and
the at least one processor is further configured to determine, based on the first cycle, whether to enter the intermittent operation period in the intermittent operation mode.

3. The communication device according to claim 1, wherein the at least one processor is further configured to turn off at least one circuit of the communication processing circuitry in a period other than the intermittent operation period.

4. The communication device according to claim 1, wherein a first ON period of the first time is longer than a second ON period of the second time.

5. The communication device according to claim 1, wherein, based on a first ON period of the first time that corresponds to the intermittent operation period, the at least one processor is further configured to:

turn off at least one circuit of the communication processing circuitry in a first OFF period of the first time,
turn on a communication operation of the communication processing circuitry in a second ON period of the second time in the intermittent operation period, and
turn off the communication processing circuitry in a second OFF period of the second time in the intermittent operation period.

6. The communication device according to claim 1, wherein the at least one processor is further configured to:
start the intermittent operation period based on the first time that is turned on in a period other than the intermittent operation period,
terminate the intermittent operation period based on the first time that is turned on in the intermittent operation period,
turn on a communication operation of the communication processing circuitry in a second ON period of the second time in the intermittent operation period, and
turn off at least one circuit of the communication processing circuitry in a second OFF period of the second time.

7. The communication device according to claim 1, wherein, based on a first ON period of the first time that corresponds to the intermittent operation period, the at least one processor are configured to:
turn off at least one circuit of the communication processing circuitry in a first OFF period of the first time,
turn on a communication operation of the communication processing circuitry, based on the second time that is turned on in an OFF state of the communication processing circuitry in the intermittent operation period, and
turn off the communication processing circuitry, based on the second time that is turned on in an ON state of the communication operation of the communication processing circuitry.

8. The communication device according to claim 1, wherein, based on an end of the reception from a communication network, the at least one processor is further configured to turn off at least one circuit of the communication processing circuitry in a period, wherein the period is determined to turn on the communication processing circuitry based on the second time in the intermittent operation period.

9. The communication device according to claim 1, wherein a correction process is executed on a receiver in the communication processing circuitry based on at least one or more circuit of the communication processing circuitry that enters the intermittent operation period from an OFF state and receives radio frames from a communication network.

10. The communication device according to claim 9, wherein a correction process is executed on the receiver in the communication processing circuitry in the intermittent operation period and in the OFF state of the communication processing circuitry.

11. The communication device according to claim 1, further comprising a first-2 cycle shorter than the first cycle,
wherein the at least one processor is further configured to
determine, in an occurrence of an event, whether to enter the intermittent operation period based on the first-2 cycle when a predetermined event occurs.

12. A communication method comprising:
determining whether to enter an intermittent operation period for intermittently operating a communication device based on information on a first cycle;
generating a first time which is switched on or off by the first cycle and a second time which is switched on or off by a second cycle based on control information on the first cycle and the second cycle from a base station; and
determining the intermittent operation period based on the first time and intermittently operating the communication device based on the second time in the intermittent operation period.

13. The communication method according to claim 12, wherein the communication device is operates in a normal operation mode, in which the communication device executes a communication operation, and an intermittent operation mode in which the communication device intermittently executes the communication operation, and
wherein the communication device is turned off in a period other than the intermittent operation period in the intermittent operation mode.

14. A communication method, comprising:
receiving, by a communication device in a communication network, first parameters of a first cycle and second parameters of a second cycle shorter than the first cycle;
receiving, by the communication device, control information on the communication network in association with a period, wherein the period is determined based on the first cycle or the second cycle;
generating a first time which is switched on or off by the first cycle and a second time which is switched on or off by the second cycle based on the received control information from a base station; and
determining an intermittent operation period based on the first time and intermittently operating the communication device based on the second time in the intermittent operation period.

15. The communication method according to claim 14, wherein the received control information on the communication network is in association with the period in which a communication operation is turned on based on the second cycle in the intermittent operation period, wherein the second cycle is determined by the communication device based on the first cycle.

16. A communication system comprising:
a base station that operates in a communication network; and
a terminal comprising;
communication processing circuitry configured to receive data from the base station; and
at least one processor configured to:
set a first cycle and a second cycle based on first parameters of the first cycle and second parameters of the second cycle shorter than the first cycle, wherein the first parameters are received by the terminal from the communication network;
determine a period to enter an intermittent operation mode based on the first cycle;
determine whether to enter an intermittent operation period for an intermittent operation of the communication processing circuitry per the second cycle based on the first cycle, and intermittently operate the communication processing circuitry;
generate a first time which is switched on or off by the first cycle and a second time which is switched on or off by the second cycle based on control information on the first and second cycles from the base station; and determine the intermittent operation period based on the first time wherein the communication processing circuitry is intermittently operated based on the second time in the intermittent operation period.

* * * * *